United States Patent
Petiton et al.

(10) Patent No.: US 11,298,967 B2
(45) Date of Patent: Apr. 12, 2022

(54) OPTICAL SECURITY COMPONENT VISIBLE IN REFLECTION, MANUFACTURE OF SUCH A COMPONENT, AND SECURE DOCUMENT PROVIDED WITH SUCH A COMPONENT

(71) Applicant: SURYS, Bussy Saint Georges (FR)

(72) Inventors: Valéry Petiton, Vendrest (FR); Khalil Chikha, Bussy Saint Georges (FR); Yoran Eli Pigeon, Brest (FR); Vincent Tollet, Bouleurs (FR); Françoise Daniel, Champs sur Marne (FR)

(73) Assignee: SURYS, Bussy Saint Georges (FR)

( * ) Notice: Subject to any disclaimer, the term of this patent is extended or adjusted under 35 U.S.C. 154(b) by 0 days.

(21) Appl. No.: 16/620,181

(22) PCT Filed: Jun. 5, 2018

(86) PCT No.: PCT/EP2018/064801
§ 371 (c)(1),
(2) Date: Feb. 10, 2020

(87) PCT Pub. No.: WO2018/224512
PCT Pub. Date: Dec. 13, 2018

(65) Prior Publication Data
US 2020/0223243 A1 Jul. 16, 2020

(30) Foreign Application Priority Data
Jun. 6, 2017 (FR) .................................. 1755002

(51) Int. Cl.
*B42D 25/328* (2014.01)
*B42D 25/324* (2014.01)
(Continued)

(52) U.S. Cl.
CPC ......... *B42D 25/328* (2014.10); *B42D 25/324* (2014.10); *B42D 25/373* (2014.10); *G02B 5/1852* (2013.01); *B42D 25/355* (2014.10)

(58) Field of Classification Search
CPC .... B42D 25/29; B42D 25/324; B42D 25/328; B42D 25/355; B42D 25/373; G02B 5/1852; G02B 5/1861
See application file for complete search history.

(56) References Cited

U.S. PATENT DOCUMENTS

| | | |
|---|---|---|
| 2008/0259456 A1 | 10/2008 | Schilling et al. |
| 2011/0069360 A1 | 3/2011 | Dichtl et al. |

(Continued)

FOREIGN PATENT DOCUMENTS

| | | |
|---|---|---|
| DE | 102012020550 A1 | 4/2014 |
| WO | 2015154943 A1 | 10/2015 |
| WO | 2016177470 A1 | 11/2016 |

OTHER PUBLICATIONS

International Search Report issued in International Application No. PCT/EP2018/064801, dated Sep. 28, 2018 (6 pages).

(Continued)

*Primary Examiner* — Sathavaram I Reddy
(74) *Attorney, Agent, or Firm* — Osha Bergman Watanabe & Burton LLP

(57) ABSTRACT

According to a first aspect, the invention relates to an optical security component intended to be observed in reflection, with the naked eye, according to face of observation. It comprises a first layer made of dielectric material, having a first refractive index ($n_1$), at least one first diffractive structure ($S_1$, $S_2$) etched on said first layer. The first diffractive structure comprises a first pattern with at least one set of modules disposed side-by-side, in a given direction (X) of arrangement, a maximum width (l) of each module defined in the direction of arrangement (X) being less than 300 µm.

(Continued)

Each module comprises a bas-relief with a first set of facets whose forms are determined to simulate an optical element visible in reflection, with at least one convex or concave region, said optical element having a profile with a continuously variable slope in a single direction (Y), said direction of variation of the slope, at right angles to the direction of arrangement (X). For two modules side-by-side, the slope along at least one line parallel to the direction (X) of arrangement is different between said two modules.

17 Claims, 18 Drawing Sheets

(51) Int. Cl.
      *B42D 25/373*      (2014.01)
      *G02B 5/18*      (2006.01)
      *B42D 25/355*      (2014.01)

(56) References Cited

U.S. PATENT DOCUMENTS

| | | |
|---|---|---|
| 2015/0192897 A1 | 7/2015 | Schilling et al. |
| 2016/0023495 A1 | 1/2016 | Fuhse et al. |
| 2017/0021660 A1 | 1/2017 | Petiton et al. |

OTHER PUBLICATIONS

Written Opinion issued in International Application No. PCT/EP2018/064801; dated Sep. 28, 2018 (11 pages).
Notification of Reasons of Refusal issued in Japanese Application No. 2019-572840; dated Aug. 4, 2020 (12 pages).

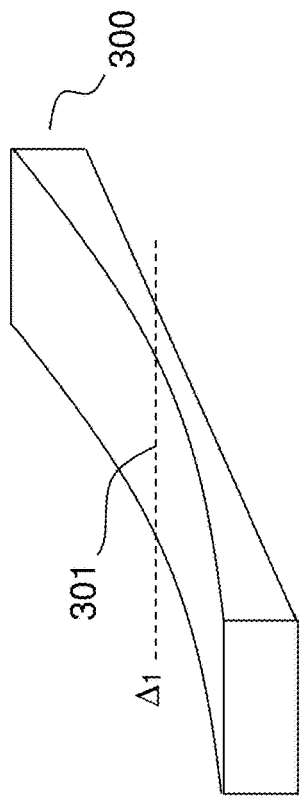
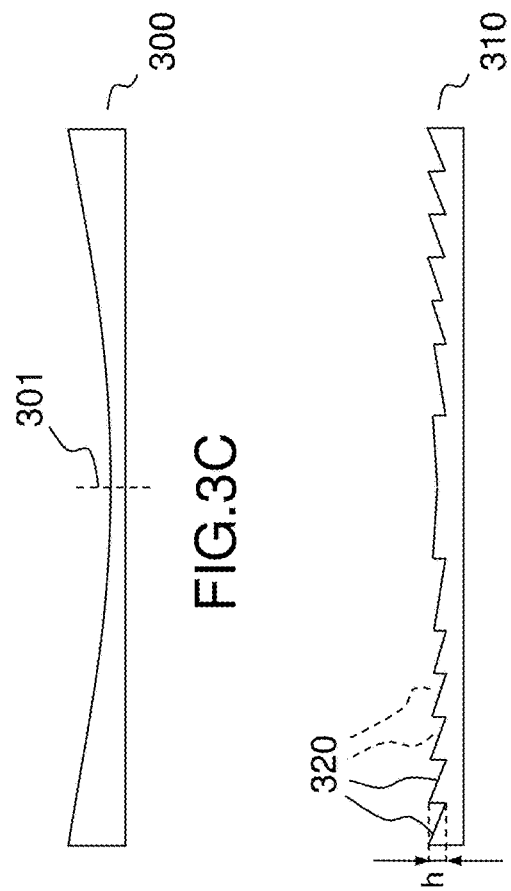
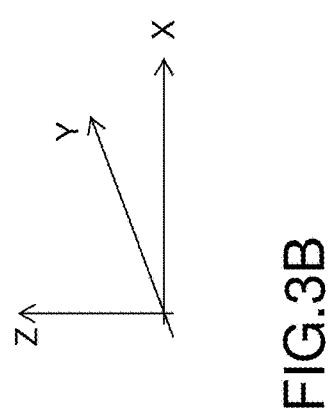

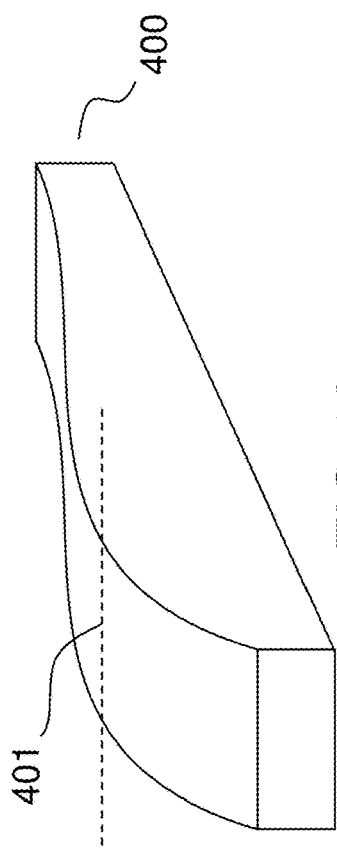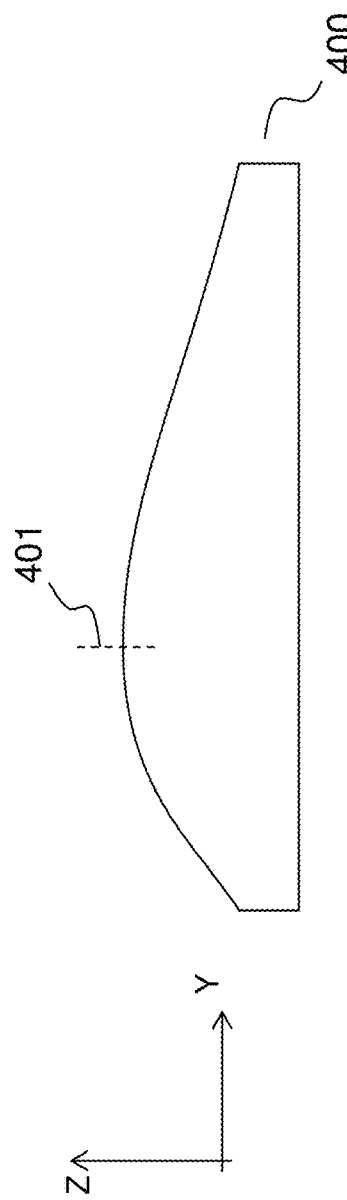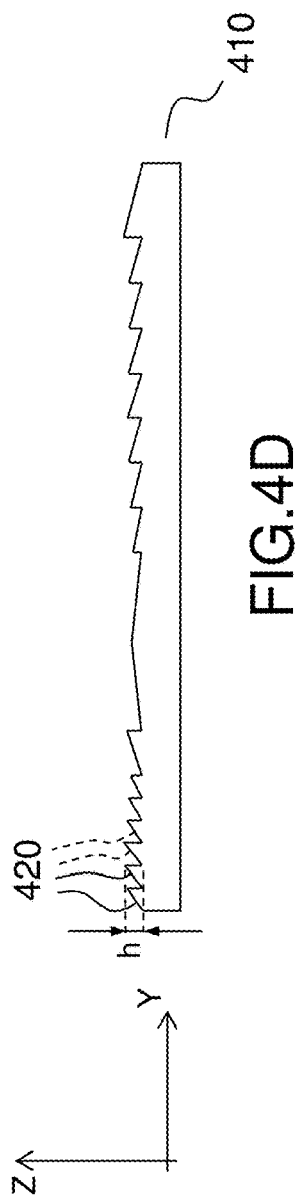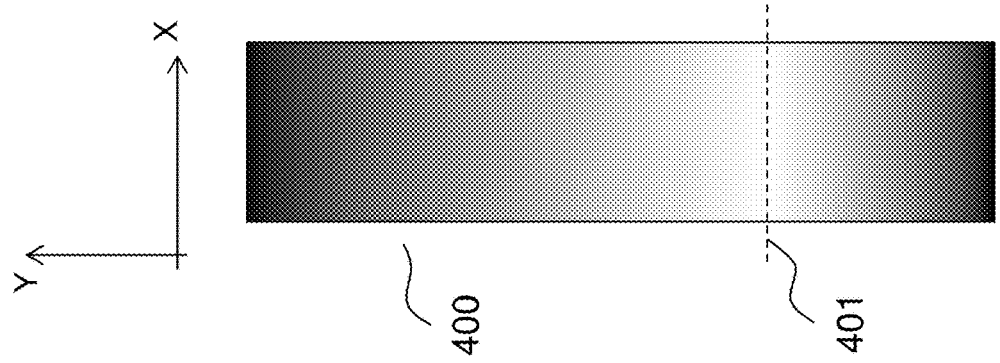
FIG.4A
FIG.4B
FIG.4C
FIG.4D

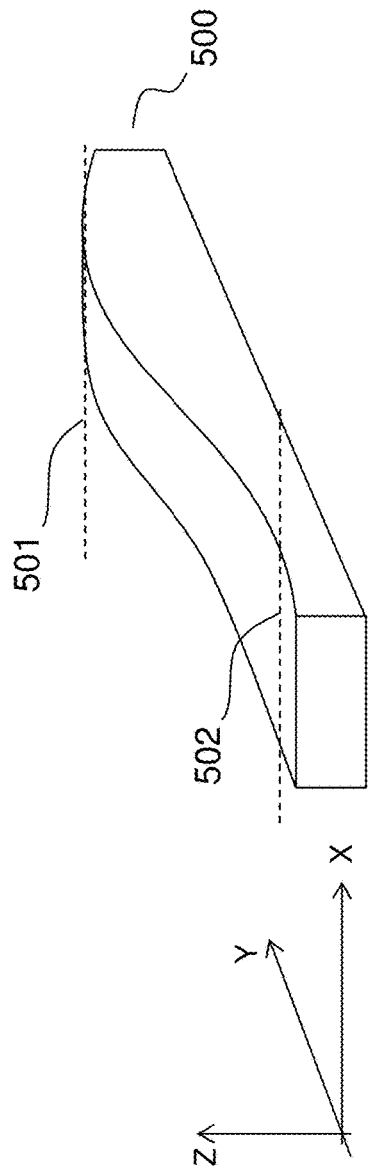
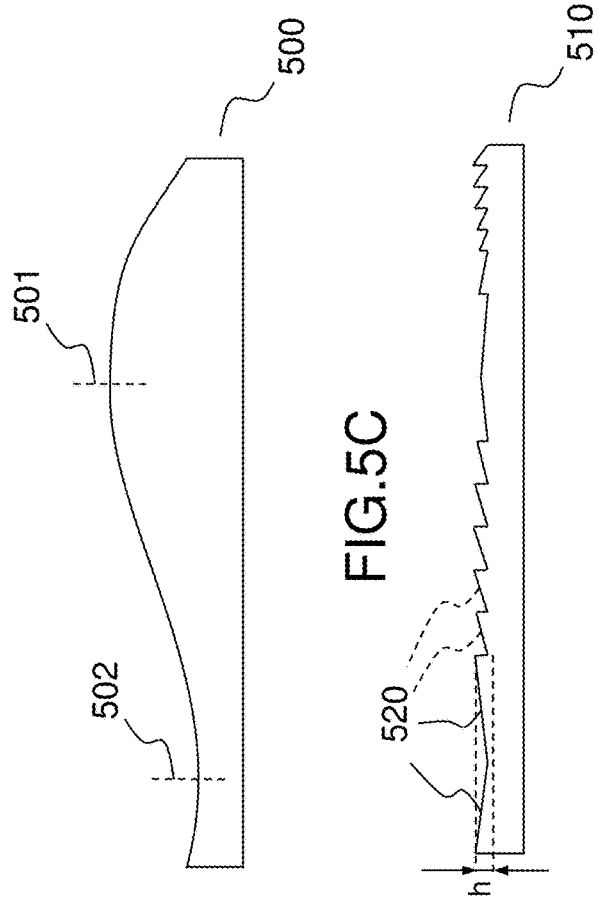
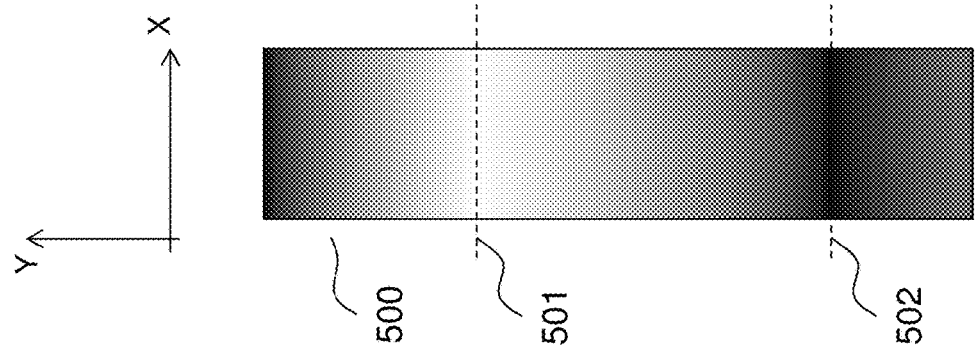
FIG.5A
FIG.5B
FIG.5C
FIG.5D

OPTICAL SECURITY COMPONENT VISIBLE IN REFLECTION, MANUFACTURE OF SUCH A COMPONENT, AND SECURE DOCUMENT PROVIDED WITH SUCH A COMPONENT

TECHNICAL FIELD

The present description relates to the field of security marking. More particularly, it relates to an optical security component that is visible in reflection for checking the authenticity of a document, to a method for fabricating such a component and to a secure document equipped with such a document.

STATE OF THE ART

Many technologies are known for authenticating documents or products, and in particular for securing documents such as documents of value of banknote, passport or other identification document type. These technologies aim to produce optical security components whose optical effects as a function of the observation parameters (orientation of the component relative to the axis of observation, position and dimensions of the light source, etc.) take highly characteristic and verifiable configurations. The general aim of these optical components is to provide novel and differentiated optical effects, from physical configurations that are difficult to reproduce. Among these components, DOVID, standing for "Diffractive Optical Variable Image Device", is used to denote the optical components that produce diffractive and variable images, commonly called holograms.

It is known practice, for example, to generate an effect consisting of a dynamic variation of an optical effect, for example in the form of movement in a given direction of a light and/or colored zone, sometimes called "rolling bar", the movement resulting from a variation of the tilt angle of the component. An observer can then observe a light and/or colored zone which moves along an image when the component is rotated, which constitutes an additional authentication check.

Such dynamic optical effects presenting "rolling bars" are for example described in the patent application WO 2015154943 in the name of the applicant and a figure of which is reproduced in the present application (FIG. 1). An optical security component described in the abovementioned application presents an effect that is visible in reflection. The optical security component comprises a diffractive structure etched on a layer of a dielectric material. The structure has a first pattern comprising a bas-relief with a first set of facets whose forms are determined so as to simulate a series of concave or convex cylindrical optical elements, visible in reflection, this first pattern being modulated by a second pattern forming a sub-wavelength grating. As appears in the example illustrated in FIG. 1, in a first region reference 11, the first pattern makes it possible to simulate a series of concave cylindrical elements 12 and in a second region referenced 21, the first pattern makes it possible to simulate a series of convex cylindrical elements 22. Moreover, in each of the regions 11 and 21, the first pattern is modulated by a second pattern to form, respectively, a first subwavelength grating and a second subwavelength grating acting, after deposition of a thin layer of high-index dielectric material for example, and encapsulation of the structure, as, respectively, first and second wavelength-subtractive filters. The cylindrical elements 12, 22 have dimensions for example of approximately 2 mm width and 12 mm length, which makes them visible to the naked eye. Such an optical security component thus presents a dynamic visual effect of light bands 13, 23, of different colors and scrolling in opposite directions when it undergoes a tilt rotation about an axis parallel to one of the main directions $\Delta 1$, $\beta 2$ of the cylindrical elements.

However, in the known prior art, only dynamic effects of rolling bar type have been described. The present application describes an optical security component with an original structure that makes it possible to access more complex dynamic visual effects, making it possible to simulate differentiated messages, therefore messages that are easier to recognize, and ultimately ensuring an even more robust authentication.

SUMMARY

According to a first aspect, the invention relates to an optical security component intended to be observed in reflection, with the naked eye, according to at least one first face of observation, and comprising a first layer made of dielectric material, having a first refractive index and at least one first diffractive structure etched on said first layer.

In an optical security component according to the first aspect, said first diffractive structure comprises a first pattern with at least one set of modules disposed side-by-side, in a given direction of arrangement, a maximum width of each module defined in the direction of arrangement being less than 300 µm. Each module comprises a bas-relief with a first set of facets whose forms are determined to simulate an optical element visible in reflection, with at least one convex or concave region, said optical element having a profile with a continuously variable slope in a single direction, called direction of variation of the slope, at right angles to the direction of arrangement. Moreover, for two modules side-by-side, the slope along at least one line parallel to the direction of arrangement is different between said two modules.

The first layer made of dielectric material is at least partially transparent in the spectral band of observation of the component, that is to say in the visible spectrum for observation with the naked eye. An "at least partially transparent" layer is defined as a layer having a transmission of at least 70%, preferably at least 80%, for a wavelength lying in the spectral band of observation.

Such an optical security component presents, in reflection and under the effect of a tilt movement about an axis parallel to said direction of arrangement, a dynamic visual effect, that is a function of the arrangement of said modules, and comprising the movement of one or more complex graphic elements, such as, for example, the crossing of two straight segments "moving" in the same direction at different speeds or in opposite directions and/or the movement of an oblique straight segment relative to the direction of arrangement. This complex dynamic visual effect offers, by comparison to simple horizontal rolling bars, a more secure authentication and a stronger technological barrier, by virtue of the design and the fabrication of the modules necessary to obtain the visual effect described above.

Tilt movement is understood to mean a rotation of the component about an axis parallel to the direction of arrangement of the modules. The tilt angle is routinely +/−45°, preferably +/−30°, about a nominal position of observation. The nominal position of observation is defined, for example, for an observation under vertical lighting, by a component inclined in such a way as to present an angle of 45° between the normal to the component and the vertical direction.

A maximum width of the modules less than 300 µm allows each of the modules not to be able to be distinguished with the naked eye, which makes it possible to give an observer a visual effect of continuous, straight or curved lines. An observer thus perceives either straight segments or curves composed of small juxtaposed straight segments. In practice, there will be able to be a minimum number of modules determined by the maximum width of the modules, such that the first structure is visible to the naked eye. Thus, in practice, a minimum dimension of the first structure will be able to be greater than 1 mm, preferably greater than 2 mm, preferably greater than 5 mm.

According to one or more exemplary embodiments, the heights of the facets forming the first pattern are determined to favor a plurality of orders of diffraction at one and the same observation angle in order to obtain a polychromatic diffraction; in other words, a diffraction with several wavelengths deriving or not from the same order of diffraction and with a substantially identical observation angle, that is to say within an angular range smaller than 2°, preferably smaller than 1°. The plurality of the orders of diffraction makes it possible to generate, for the eye of the observer, by additive synthesis, a "white" or "achromatic" effect.

According to one or more exemplary embodiments, said modules of the set of modules each have a substantially constant width in said direction of variation of the slope. The width can be the same for all the modules or at least two of said modules can have a different width. Having modules of different widths makes it possible to create moving graphic elements which present, in reflection, different light intensities.

According to one or more exemplary embodiments, at least one of said modules has a variable width in said direction of variation of the slope. Said module can have, for example a triangular or pyramidal form, or any other non-rectangular form, which makes it possible to create cross-dissolve visual effects for example between 2 modules of inverted pyramidal form, or to create an additional level of authentication of the component, by means of an observation of the modules under a microscope.

According to one or more exemplary embodiments, the set of modules comprises a first subset of modules and a second subset of modules, such that the modules of the first subset of modules make it possible to simulate optical elements with at least one concave region, the modules of the second subset of modules make it possible to simulate optical elements with at least one convex region, the modules of the first subset are disposed alternately with the modules of the second subset.

Such an arrangement of the modules makes it possible to form an optical security component which presents, in reflection and under the effect of a tilt movement, an original dynamic visual effect, comprising the crossing of two straight segments.

Moreover, by alternating the modules of the first and second subsets of modules, an observer perceives the effects linked to each of the subsets simultaneously.

According to one or more exemplary embodiments, the set of modules comprises at least one first subset of modules, such that the modules of said first subset of modules make it possible to simulate optical elements with, for each of said optical elements, at least one first concave region or at least one first convex region, each one of said first regions comprising a flat line parallel to the direction of arrangement. Moreover, for two successive modules of said first subset of modules, said flat lines are staggered in the direction of variation of the slope.

A flat line is, within the meaning of the present description, a line parallel to the direction of arrangement of the modules at which the slope of the profile of the optical element simulated by said module is canceled.

Such an arrangement of the modules makes it possible to form an optical security component which presents, in reflection and under the effect of a tilt movement, an original dynamic visual effect comprising the movement of an oblique straight segment relative to the direction of arrangement of the modules. By acting on the staggering of successive modules it will be possible to form broken lines with several segments.

According to one or more exemplary embodiments, for several successive modules of said first subset of modules, said flat lines are staggered in the direction of variation of the slope with an offset less than 300 µm, in order to present to an observer a visual effect of a line which seems continuous. By acting on the direction and the amplitude of the offset for example with continuously variable offset along the axis at right angles to the direction of arrangement, it is also possible to generate curves.

According to one or more exemplary embodiments, the set of modules comprises at least one first subset of modules, such that the modules of said first subset of modules make it possible to simulate optical elements with at least one first concave region for all said modules of said first subset and/or at least one first convex region for all said modules of said first subset and at least two of said modules of the first subset of modules make it possible to simulate optical elements having profiles with different slope variation functions.

Such an arrangement of the modules makes it possible to form an optical security component which presents, in reflection and under the effect of a tilt movement, an original dynamic visual effect of a moving graphic element being deformed.

Depending on the visual effects sought, the modules of the set of modules of the optical security component according to the first aspect can be designed to simulate different optical elements having at least one convex region and/or at least one concave region.

Thus, according to one or more exemplary embodiments, at least one of said modules makes it possible to simulate an optical element with a profile having a variable slope in said direction of variation of the slope, symmetrical (in absolute value) relative to a flat line parallel to the direction of arrangement. The symmetry of the slope function makes it possible to simulate an effect of regular movement of the graphic element or elements, with a symmetry of the visual effect as a function of the positive or negative tilt values.

According to one or more exemplary embodiments, at least one of said modules makes it possible to simulate an optical element with a profile having a variable slope in said direction of variation of the slope, dissymmetrical (in absolute value) relative to a flat line, said flat line being parallel to the direction of arrangement. The dissymmetry of the slope function makes it possible to simulate speed change effects on either side of a nominal position of the component (zero tilt).

According to one or more exemplary embodiments, at least one of said modules makes it possible to simulate an optical element with at least one concave region and at least one convex region. The presence both of at least one concave region and of at least one convex region makes it possible to form a combination/plurality of visual effects of moving graphic elements.

According to one or more exemplary embodiments, modules are juxtaposed additionally in the direction at right angles to the direction of arrangement. For example, a set of modules is duplicated a given number of times in the direction at right angles to the direction of arrangement, which makes it possible to duplicate the visual effects. It is also possible to juxtapose different modules to construct more complex visual effects.

According to one or more exemplary embodiments, the optical security component also comprises a second layer, at least partly covering said first structure, and having a spectral band of reflection in the visible spectrum. Said second layer is for example a metal layer or a so-called index variation layer, having a refractive index different from that of the neighboring layers, preferably such that the difference in the refractive index values is at least equal to 0.3.

According to one or more exemplary embodiments, in at least one first region, said first pattern is modulated by a second pattern forming a periodic array of period lying between 100 nm and 700 nm, advantageously 200 nm to 500 nm, determined to produce, after deposition of the second layer, a resonant filter in a first spectral band.

Such a component makes it possible to combine the dynamic visual effect with a colored effect. Moreover, it makes possible an authentication of the optical security component by polarization in addition to authentication by the naked eye. Indeed, the resonant filters thus obtained are sensitive to polarization. By illuminating the optical security component with a polarized light, and by observing through a polarizer, it will be possible to observe an extinguishing of the color.

According to one or more exemplary embodiments, said first pattern is modulated in a first region by a first second pattern forming a first periodic array and said first pattern is modulated in at least one second region by a second second pattern forming at least one second periodic array, such that, after deposition of the second layer, the first and second periodic arrays produce resonant filters in different spectral bands.

According to one or more exemplary embodiments, said first pattern is modulated by said second pattern such that, for two modules disposed side-by-side, the spectral resonance band is different between said two modules. Such an optical security component presents, in reflection and under the effect of a tilt movement about an axis parallel to said direction of arrangement, an additional visual effect which is a dynamic colored effect, that is a function of the arrangement of said modules. The modular arrangement of the first pattern makes it possible to generate original colors resulting from additive combinations of the properties of each module, original colors that could not always be perceived in the optical security components of the prior art.

According to one or more exemplary embodiments, said first pattern is modulated by said second pattern such that the spectral resonance band is different on two regions of at least one first module.

According to one or more exemplary embodiments, the optical security component also comprises a third layer made of dielectric material deposited on said second layer and having a third refractive index. The second layer is a thin layer of dielectric material, having a second refractive index such that the difference between the second refractive index and the first refractive index and the difference between the second refractive index and the third refractive index is at least equal to 0.3. The second pattern is adapted to produce, after deposition of the second layer and encapsulation of said first structure by the third layer, a bandpass resonant filter in reflection.

According to one or more exemplary embodiments, the second layer is a thin layer of metal material, of thickness greater than 40 nm and the second pattern is adapted to produce a band stop resonant filter in reflection.

According to one or more exemplary embodiments, said first structure has an outline forming a recognizable graphic form.

According to one or more exemplary embodiments, the outline of the structure forms a graphic form similar to the form of a moving graphic element.

When the first pattern comprises at least one second structure, the structures can be juxtaposed, each with recognizable forms.

The optical security component according to the first aspect can comprise one or more additional layers depending on the requirements of the application, without this or these additional layers contributing to the visual effect sought.

Thus, according to one or more exemplary embodiments, the optical security component is suitable for securing a document or a product, and also comprises, on the face opposite the observation face, a layer suitable for transferring the component onto the document or the product, for example an adhesive layer or a reactivatable adhesive layer.

According to one or more exemplary embodiments, the optical security component also comprises, on the side of the first observation face, a support film intended to be detached after the transfer of the component onto the document or the product.

According to one or more exemplary embodiments, the optical security component is suitable for the fabrication of a security thread for securing banknotes, and comprises, on the side of the first observation face and/or on the face opposite the first observation face, one or more protection layers.

According to a second aspect, the present description relates to methods for fabricating optical security components according to the first aspect.

Thus, the present description relates to a method for fabricating an optical security component intended to be observed in reflection, with the naked eye, along at least one first observation face, the method comprising:
the deposition on a support film of a first layer of a material having a first refractive index,
the formation on said first layer of at least one first structure such that:
said first structure comprises a first pattern with at least one set of modules disposed side-by-side, in a given direction of arrangement, a maximum width of each module defined in the direction of arrangement being less than 300 μm;
each module comprises a bas-relief with a first set of facets whose forms are determined to simulate an optical element visible in reflection, with at least one convex or concave region, having a profile with a variable slope in a single direction, called direction of variation of the variation of the slope, at right angles to the direction of arrangement;
for two modules disposed side-by-side, the slope along at least one line parallel to the direction of arrangement is different between said two modules.

According to one or more exemplary embodiments, the method also comprises the deposition of a second layer, at least partly covering said first structure, and having a spectral band of reflection in the visible spectrum.

BRIEF DESCRIPTION OF THE FIGURES

Other features and advantages of the invention will become apparent on reading the following description, illustrated by the following figures:

FIGS. 3 to 5, diagrams illustrating modules in an optical security component according to the present description, with different slope profiles;

DETAILED DESCRIPTION

In the figures, the elements are not represented to scale for better visibility.

Figure 1:
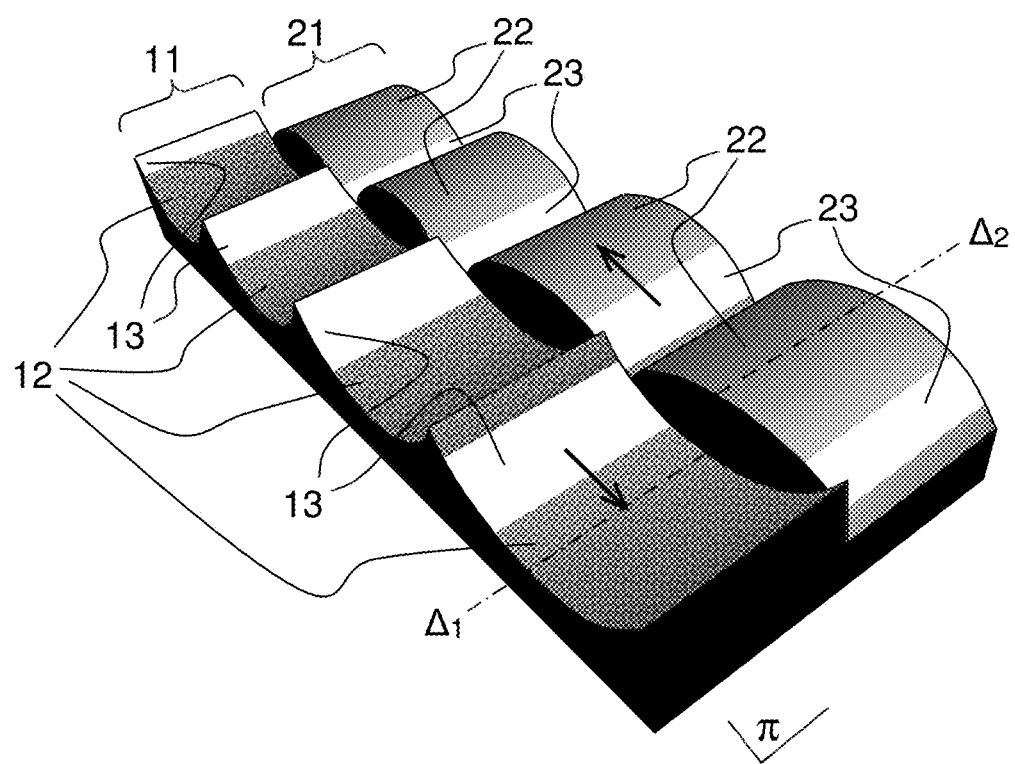
FIG. 1, already described, illustrates an example of double rolling bars according to the prior art.
Figure 2A:
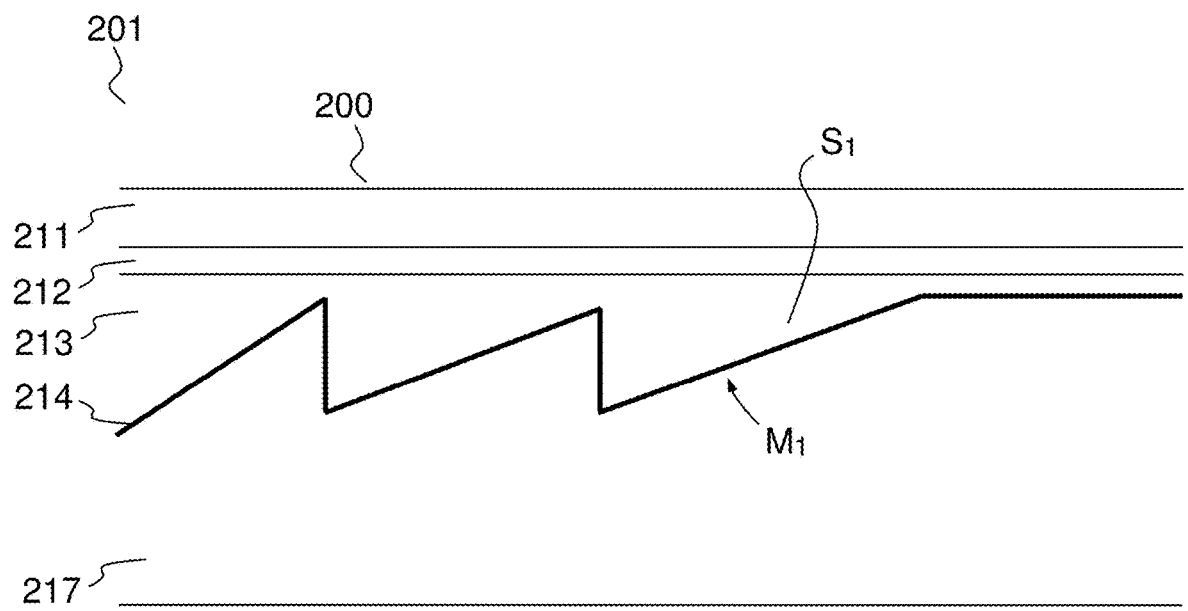
FIGS. 2A and 2B, illustrate cross-sectional views of exemplary embodiments of components according to the present description.
Figure 2B:
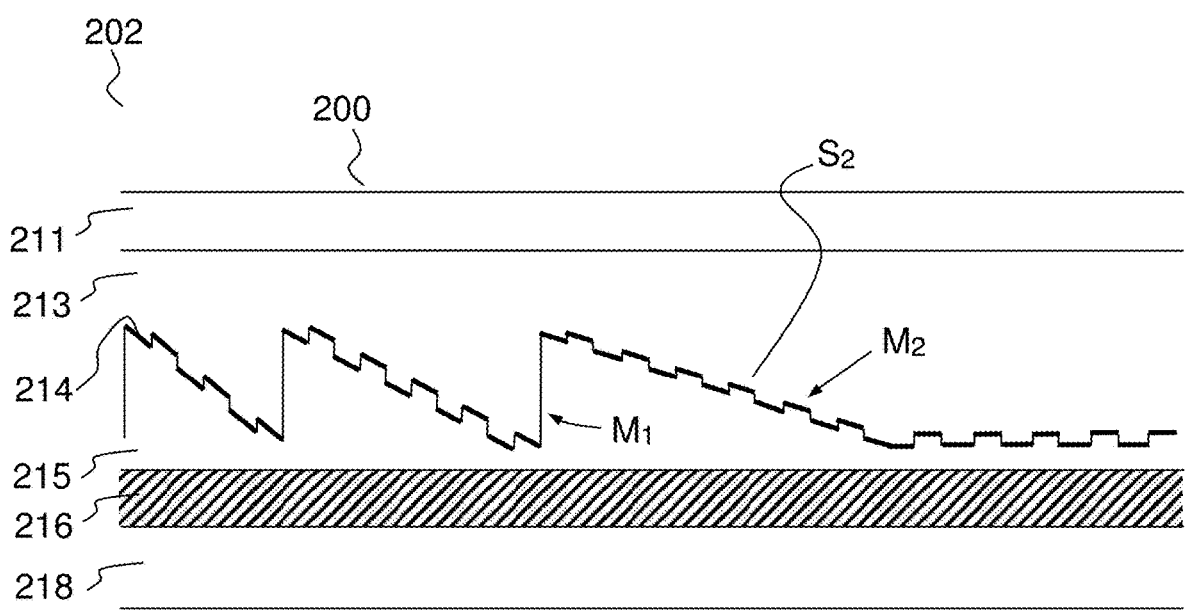

FIGS. 2A and 2B represent, by (partial) cross-section view, two examples of optical security components according to the present description.

The optical security component 201 represented in FIG. 2A represents, for example, an optical security component intended to be transferred onto a document or a product in order to secure it. It comprises, according to this example, a support film 211, for example a film of polymer material, for example a film of polyethylene terephthalate (PET) of a few tens of micrometers, typically 15 to 100 µm, and a detachment layer 212, for example of natural or synthetic wax. The detachment layer makes it possible to remove the polymer support film 211 after transfer of the optical component onto the product or document to be secured. The optical security component 201 also comprises a first layer 213 made of dielectric material, having a first refractive index $n_1$ and at least one first diffractive structure $S_1$, comprising a first pattern $M_1$, stamped on said first layer 213 and which will be described in more detail hereinbelow.

In the example of FIG. 2A, the optical security component 201 also comprises a second layer 214 at least partly covering said first structure $S_1$, and having a spectral band of reflection in the visible spectrum. The second layer 214 is, for example, a metal layer or a so-called index variation layer, having a refractive index different from that of the neighboring layers, the difference in index between the layers 213 and 214 having a value at least equal to 0.3. The layer 214 makes it possible to ensure the reflection of the incident light.

The optical security component also comprises one or more layers that are not optically functional but suited to the application, for example, in the example of FIG. 2A, an adhesive layer 217, for example a layer of hot-reactivatable adhesive, for the transfer of the optical security component onto the product or document.

In practice, as will be detailed hereinbelow, the optical security component can be fabricated by stacking the layers on the support film 211, then the component is transferred onto a document/product to be secured using the adhesive layer 217. Optionally, the support film 211 can then be detached, for example by means of the detachment layer 212. The main observation face 200 of the optical security component is thus on the side of the first layer 213 opposite the etched face of the layer 213.

The optical security component 202 represented in FIG. 2B represents, for example, an optical security component intended for the securing of banknotes; it is, for example, a part of a security thread intended to be incorporated in the paper during the manufacturing of the banknote. In this example, the component 202 comprises, as previously, a support film 211 (12 to 25 µm) which will also serve as protection film for the security thread, and, as in the example of FIG. 2A, a first layer 213 made of dielectric material having a first refractive index $n_1$, at least one first diffractive structure $S_2$, stamped on said first layer 213, and a second layer 214 at least partly covering said first structure $S_2$, and having a spectral band of reflection in the visible spectrum. As emerges from FIG. 2B, the structure $S_2$ differs from the structure $S_1$ notably in that it has a first pattern $M_1$ modulated by a second pattern $M_2$ forming a subwavelength periodic grating, as will be described in more detail hereinbelow. The optical security component 202 also comprises, in the example of FIG. 2B, a set of layers 215, 216, 218, respectively an encapsulation layer 215, an optional opaque colored contrast layer 216 and a protection layer 218, for example a second polymer film or a lacquer. As in the preceding example, the fabrication can be performed by stacking of the layers on the support film 211. The protection layer 218 is then deposited to give the security thread the necessary solidity. The encapsulation 215 and colored contrast 216 layers are optional; they can also form only a single layer. The adhesive layer 218 and the layer 215 can also form only one and the same layer having both functions.

It will emerge to the person skilled in the art that other, optically non-functional layers can be added depending on the requirements of the application in each of the examples represented in FIGS. 2A and 2B and that the variant embodiments presented in FIGS. 2A and 2B can be combined; in particular, each of the structures of type S1 comprising a first pattern $M_1$, or of type S2 comprising a first pattern $M_1$ modulated by a second pattern $M_2$, can be used equally in an optical security component intended to be transferred onto a document or a product in order to secure same or in an optical security component intended for the securing of banknotes.

Note that, if the additional, optically non-functional, layers, for example the layer 217, or the layers 215, 216, 218, are transparent, as well as the destination support, the optical security component will be able to be seen from both sides, with an inversion of the curvatures of the optical elements generated.

According to one or more exemplary embodiments of the present description, the first pattern $M_1$ comprises at least one set of modules disposed side-by-side, in a given direction of arrangement, a maximum width of each module defined in the direction of arrangement being less than 300 µm. Each module comprises a bas-relief with a first set of facets whose forms are determined to simulate an optical element visible in reflection seen from the observation face 200, with at least one convex or concave region, said optical element having a profile with a variable slope in a single direction, called direction of variation of the slope, at right angles to the direction of arrangement.

For the determination of the form of the first pattern, reference can be made to the method for forming Fresnel lenses, as illustrated by means of FIGS. 3 to 5, which thus illustrate different examples of modules adapted to form the first pattern according to the present description.

More specifically, FIGS. 3A to 3D illustrate a first example of a module 310, represented in cross section in FIG. 3D. The module 310 comprises a first diffractive pattern formed by a set of facets 320 and determined to simulate an optical element visible in reflection 300, said optical element 300 being represented in perspective in FIG. 3A and in cross section in FIG. 3C. As emerges in FIGS. 3A and 3C, the optical element 300 has a profile of elevation along the axis Z, with a variable slope in a single direction Y, called direction of variation of the slope, the modules 310 being intended to be arranged in a direction X of arrangement at right angles to the direction Y of variation of the slope.

The reflective optical element 300 that is sought to be reproduced with the bas-relief 310 is, in the example of FIGS. 3A to 3D, a concave reflective optical element, for example a cylindrical reflective element formed by a section of cylinder whose generatrix defines a main direction parallel to X. Alternatively, it could be a portion of ellipse, of parabola or any other symmetrical curve. The choice of the curve is led by the expected speed variation of the visual effect for a given tilt rotation. The optical element 300 comprises a flat line 301, corresponding to the line of cancelation of the slope, corresponding to the line for which $$\frac{dz}{dy} = 0;$$

the flat line is at right angles to the direction of variation of the slope Y. FIG. 3B represents a plan view of the optical element 300 in which, by convention, the most scooped concave regions are represented with dark grays and the least scooped regions are represented with light grays.

In the examples of FIGS. 3A and 3D, the optical element 300 is also symmetrical relative to a longitudinal axis (denoted $\Delta_1$), here coinciding with the flat line 301.

The arrangement of modules such as those represented in FIG. 3D and making it possible to form symmetrical optical elements, makes it possible to obtain a symmetry of the observed effect for positive or negative tilt angles.

Obviously, a description similar to that given by means of FIGS. 3A to 3D in the case of a concave reflective element can be given for a convex reflective element.

FIGS. 4A to 4D illustrate a second example of a module 410, represented in cross section in FIG. 4D. The module 410 comprises a first diffractive pattern formed by a set of facets 420 and determined so as to simulate an optical element visible in reflection 400, said optical element 400 being represented in perspective in FIG. 4A and in cross section in FIG. 4C. As appears in FIGS. 4A and 4C, the optical element 400 has a profile of elevation on Z with a variable slope in a single direction Y, called direction of variation of the slope, the modules 410 being intended to be arranged in a direction X of arrangement at right angles to the direction Y of variation of the slope.

The reflective optical element 400 that is sought to be reproduced with the bas-relief 410 is, in the example of FIGS. 4A to 4D, a reflective optical element with a convex region, having, as in the preceding example, a flat line 401 corresponding to the line of cancelation of the slope. In this example however, the optical element 400 is not symmetrical relative to the flat line 401. FIG. 4B represents a plan view of the optical element 400 in which, by convention, the highest convex regions are represented with lighter grays and the least high regions are represented with darker grays.

The arrangement of modules such as those represented in FIG. 4D makes it possible to obtain a dissymmetry of the effect observed for positive or negative tilt angles.

Here again, a description similar to that given by means of FIGS. 4A to 4D in the case of a convex reflective element can be given for a concave reflective element.

FIGS. 5A to 5D illustrate a third example of a module 510, represented in cross section in FIG. 5D. The module 510 comprises a first diffractive pattern formed by a set of facets 520 and determined to simulate an optical element visible in reflection 500, said optical element 500 being represented in perspective in FIG. 5A and in cross section in FIG. 5C. As emerges in FIGS. 5A and 5C, the optical element 500 has a profile with a variable slope in the direction Y of variation of the slope, the modules 510 being intended to be arranged in a direction X of arrangement at right angles to the direction Y of variation of the slope.

The reflective optical element 500 that is sought to be reproduced with the bas-relief 510 is, in the example of FIGS. 5A to 5D, a reflective optical element with a first convex region, having a flat line 501 corresponding to the line of cancelation of the slope of the convex region and a first concave region, having a flat line 502 corresponding to the line of cancelation of the slope of the concave region. FIG. 5B represents a plan view of the optical element 500 in which, as previously, the highest regions are represented with lighter grays and the most scooped regions are represented with darker grays.

The arrangement of modules such as those represented in FIG. 5D makes it possible to obtain, for a tilt angle $-\theta_{max}$, 2 light segments which appear and move in opposite directions when the tilt angle tightens, then merge for a maximum tilt angle $+\theta_{max}$.

The determination of the set of diffractive facets to obtain a reflective optical element with at least one convex region and/or at least one concave region, as illustrated for example in FIGS. 3 to 5, can be done by known means, described for example in the application WO2011138394 in the name of the applicant.

It is possible, for example, to proceed with a meshing of the optical element with constant pitch, for example according to a set of equidistant planes, parallel to the plane XZ represented in FIGS. 3 to 5. The form of the first pattern can then be obtained by translating, in each mesh, the individual surfaces of the reflective element to obtain a first pattern in bas-relief form of reduced thickness whose facets reproduce the form of the individual surfaces. It is also possible to perform the meshing with constant level in the form of a slicing, for example according to a set of equidistant planes, parallel to the plane XY represented in FIGS. 3 to 5. As previously, the form of the first pattern can be obtained by translating the individual surfaces of the reflective element to obtain a first pattern in bas-relief form of reduced thickness whose facets reproduce the form of the individual surfaces. Such an embodiment is particularly advantageous in the context of replication by embossing because it limits the thickness variations of the resulting first pattern.

Generally, it is possible to choose one of the two approaches or else combine the two approaches to form a diffractive structure with pitches and heights of the facets determined to simulate an optical element visible in reflection with at least one concave region and/or at least one convex region. The pitches and heights of the facets (320, 420, 520) are determined according to the laws of diffraction, assuming a diffractive structure on which is deposited the first layer of dielectric material of refractive index $n_1$. The pitches lie between 2 μm and 300 μm, preferably between 3 μm and 100 μm, preferably between 4 and 50 μm. The heights are determined to favor a plurality of orders of diffraction in order to conserve an achromatic diffraction. For example, the height h of the facets of the first pattern generally lies between 0.1 and 10 microns, preferably between 0.3 and 5 μm. Each facet can be likened to a rectangle and has a large dimension corresponding to the width of the module and a small dimension, measured on the facet in a direction at right angles to the large dimension, the small dimension lying between 2 and 20 μm, preferentially between 4 and 10 μm. A module can comprise a few tens to a few thousands of facets to form the diffractive structure.

Although the modules forming the first pattern of an optical security component according to the present description, illustrated in FIGS. 3 to 5, have a form in the plane XY that is substantially rectangular, other forms are possible.

Figure 6:
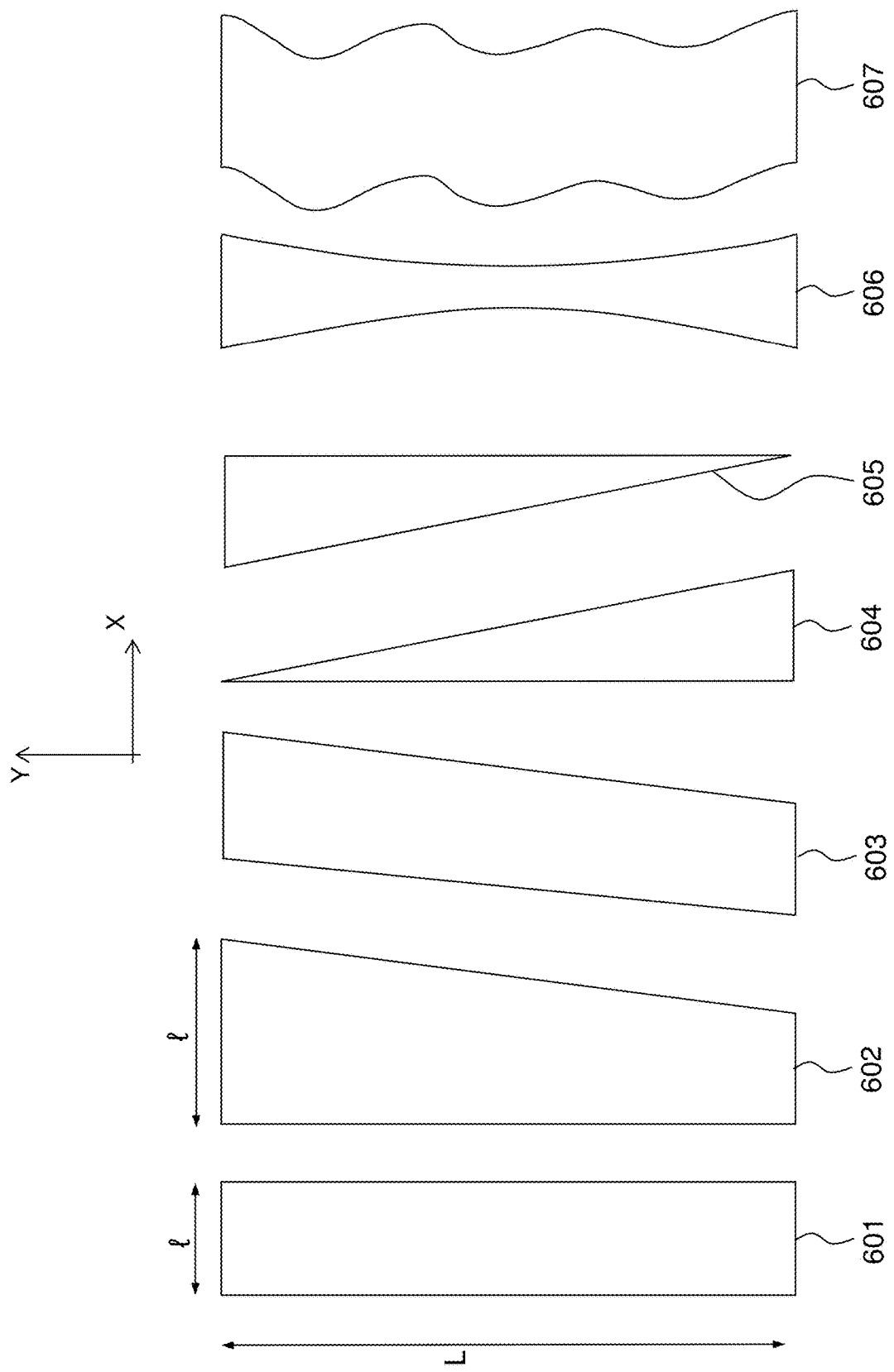
FIG. 6, diagrams illustrating outer forms of modules in an optical security component according to the present description.

FIG. 6 thus represents different forms, referenced 601 to 607, of modules according to the present description, the modules being represented from above, that is to say in a plane XY defined respectively by the directions of arrangement X and of variation of the slope Y.

For example, modules of inverted pyramid form (for example 604, 605) can make it possible to create cross-dissolve visual effects. Modules of complex form (606, 607) can allow for an additional authentication by microscope.

It is possible to define, for each of these modules, a greater dimension L and a width l which can be variable (case of the forms 602 to 606). In all cases however, a maximum value l of the width is less than 300 μm. For a rectangular module, a preference of choice will be given to 10 μm<l<300 μm, preferably 30 μm<l<100 μm. For L, a preference of choice will be given to 2 mm<L<50 mm, preferably 5 mm<L<20 mm. The final length of each of the modules can be determined by the graphic pupil.

According to one or more exemplary embodiments of an optical security component of the present description, for two modules disposed side-by-side, the slope along at least one line parallel to the direction of arrangement X is different between said two modules. The applicant has shown that such an optical security component has, in reflection and under the effect of a tilt movement about an axis parallel to said direction of arrangement, a dynamic visual effect comprising the crossing of two straight segments and/or the movement of an oblique straight segment, as a function of the arrangement of said modules.

Nonlimiting examples of such dynamic visual effects are illustrated by means of FIGS. 7 to 14.

In FIGS. 7A, 8A, 9A, 10A, 11A, 12A, 13A, 14A, in the interests of simplification, only a set of a few modules has been represented for each optical security component, seen from above and with the convention taken for their representation (see FIGS. 3B, 4B, 5B) according to which the most scooped concave regions are represented with dark grays and the highest convex regions are represented with light grays. In practice, a first pattern will be able to comprise a greater number of modules than is represented. Notably, modules can, in addition, be juxtaposed in the direction at right angles to the direction of arrangement. For example, the sets of modules represented in the figures can be duplicated a given number of times in the direction at right angles to the direction of arrangement to duplicate the visual effects. It is also possible to juxtapose different modules to construct more complex visual effects. FIGS. 7B, 8B, 9B, 10B, 11B, 12B, 13B, 14B illustrate the resulting visual effect when the optical security component is observed in reflection and under the effect of a tilt movement (angle θ) about an axis parallel to said direction of arrangement.

In FIGS. 9A, 10A, 11A, 12A, 13A, the structure is "pupiled", that is to say that it is delimited by an outline of substantially rectangular form, such that, on the optical security component, the visual effect is visible over a substantially rectangular region (see FIGS. 9B, 10B, 11B, 12B, 13B). The outline of said pupil is not represented in FIGS. 9A, 10A, 11A, 12A, 13A. In FIG. 14A, the structure is also pupilated, but with another form. The "pupilating" is obtained in the fabrication of the optical security component for example by application of a digital filter to the etching computer data to eliminate the etching information beyond the desired pupil, or by a physical pupil which is inserted at the time of optical registration between the incident etching beam and the photosensitive surface.

These figures, represented for illustrative purposes to show visual effects, are not represented to scale and are simplified by comparison to a real observation of a component. Moreover, the visual effects represented on each of the figures can be combined. When the modules are represented convex, effects of movement in an opposite direction can be obtained with concave modules, and vice versa.

Figure 7A:
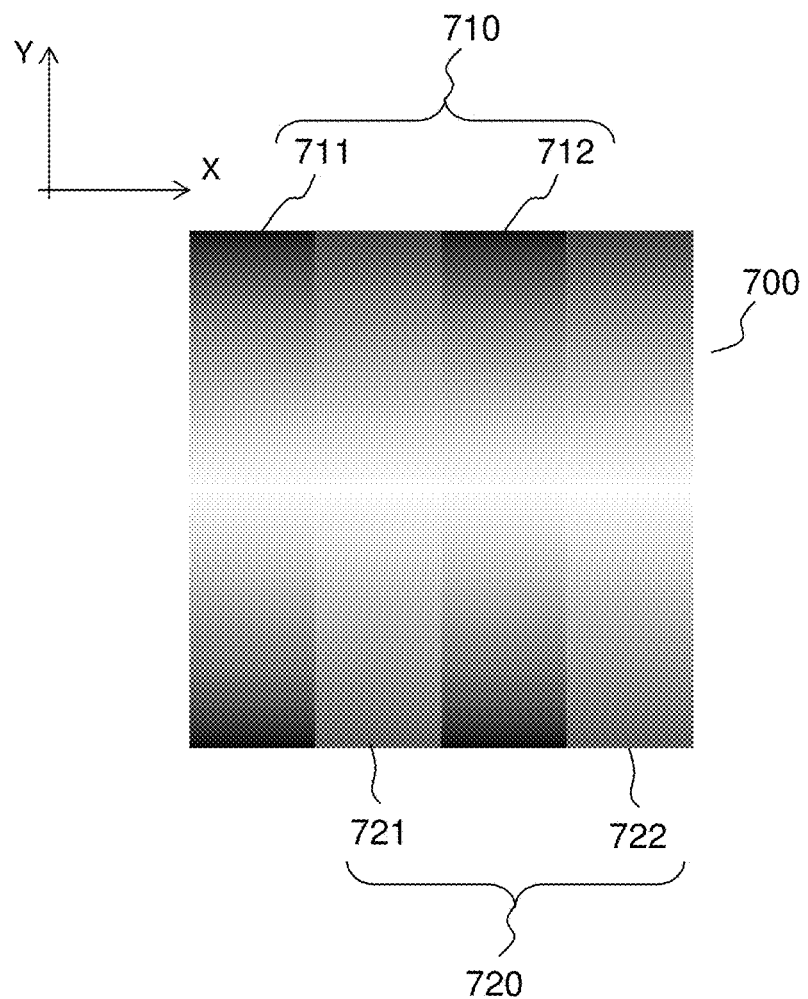
FIGS. 7 to 13, diagrams illustrating different embodiments of optical security components according to the present description and the associated visual effects.
Figure 7B:
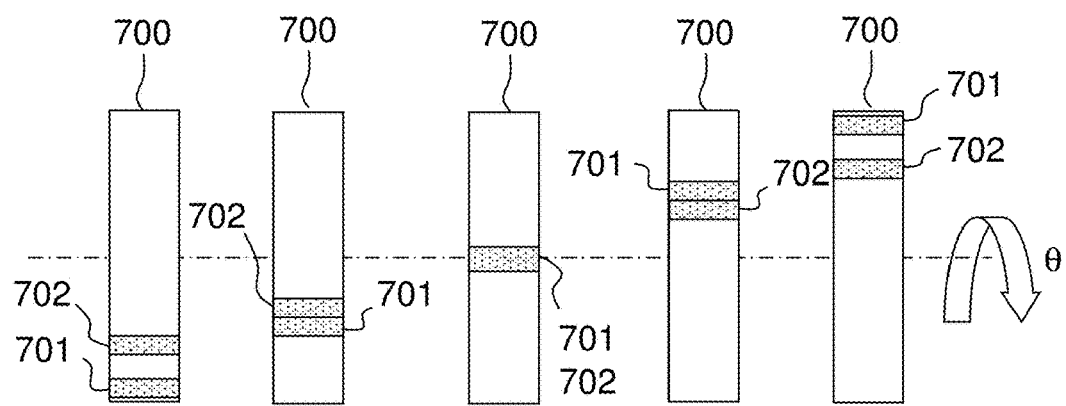

FIGS. 7A and 7B illustrate a first example of an optical security component 700 according to the present description.

In this example, the set of modules comprises a first subset of modules 710 and a second subset of modules 720, such that the modules (711, 712) of the first subset of modules 710 make it possible to simulate optical elements with a convex region and the modules (721, 722) of the second subset of modules 720 make it possible to simulate optical elements also with a convex region, but whose profile of variation of the slope is different from that of the modules of the first subset of modules. In this example, the slope variation of the modules (711, 712) of the first subset of modules 710 is more rapid than the slope variation of the modules (721, 722) of the second subset of modules 720. As appears in FIG. 7A, the modules of the first subset 710 are for example disposed alternately with modules of the second subset 720. In this example, the flat lines of the modules are substantially aligned.

As illustrated in FIG. 7B, the optical component then presents, in reflection and under the effect of a tilt movement, a dynamic visual effect of deformation comprising the movement of a double bar 701, 702 which is dissociated with the rotation of the component, the bar 701 corresponding to the first subset moving more quickly than the bar 702 corresponding to the second subset. The difference in the slope functions of the module makes it possible to give a visual effect of a central horizontal line (nominal position corresponding to a zero tilt) which splits when the document is tilted about its nominal position, such that one line crosses the other, the lines move in the same direction but not at the same speed.

Figure 8A:
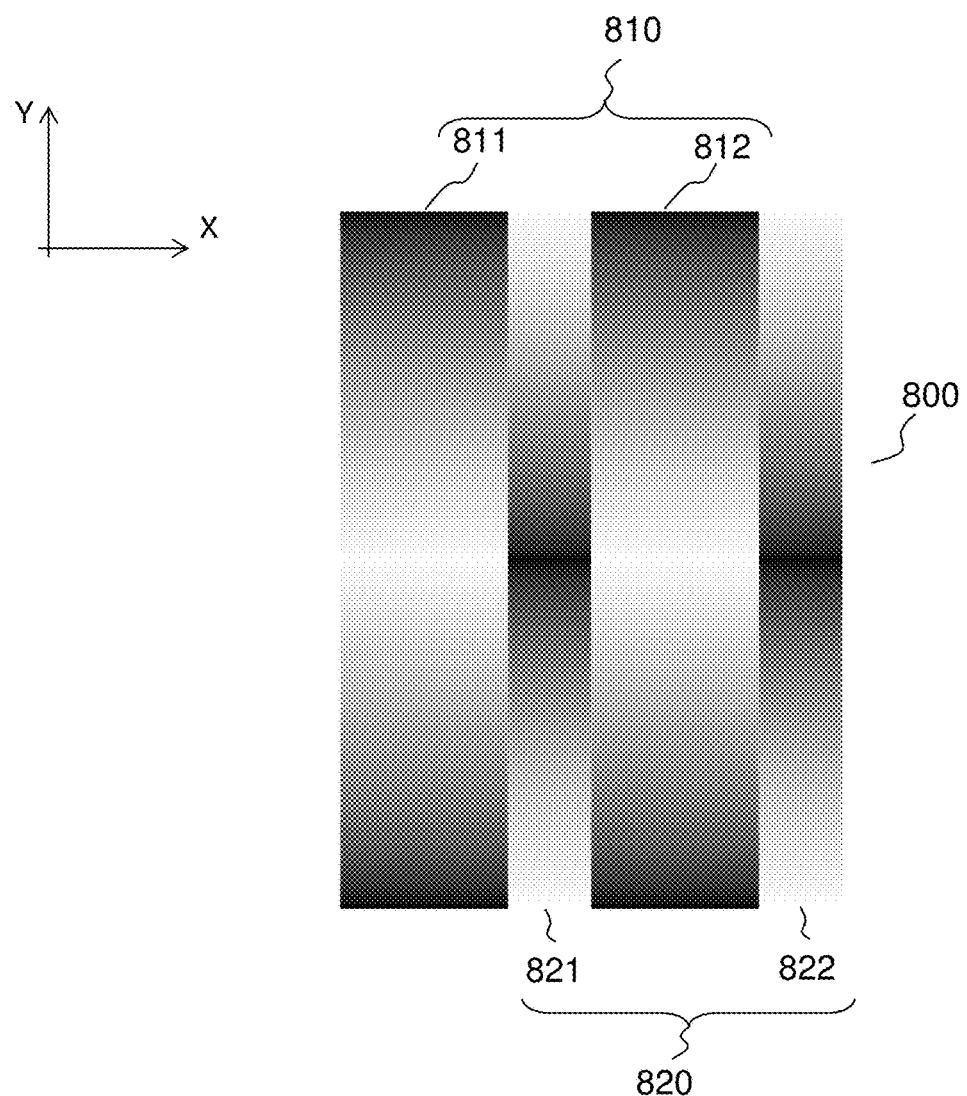
Figure 8B:
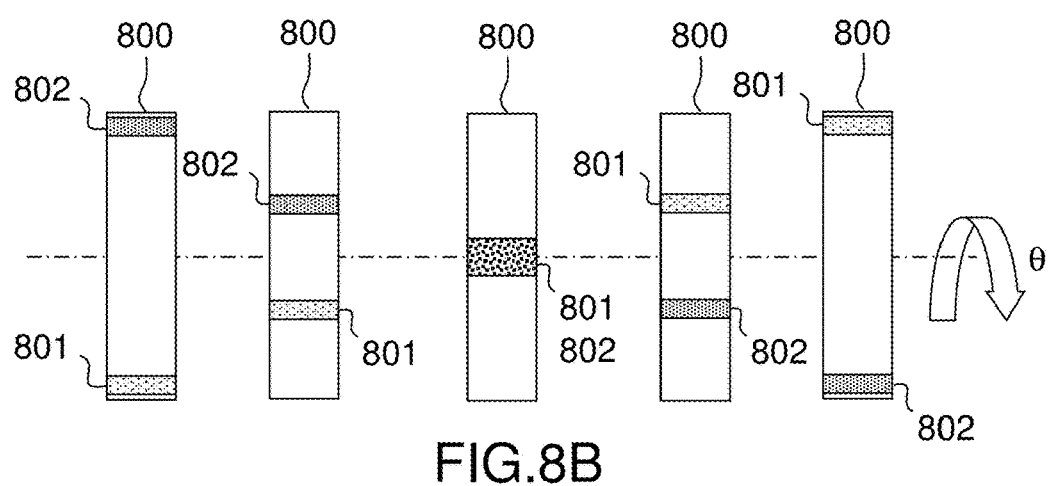

FIGS. 8A and 8B illustrate a second example of an optical security component 800 according to the present description.

In this example, the set of modules comprises a first subset of modules 810 and a second subset of modules 820, such that the modules (811, 812) of the first subset of modules 810 make it possible to simulate optical elements with at least one convex region and the modules (821, 822) of the second subset of modules 820 make it possible to simulate optical elements with at least one concave region. As appears in FIG. 8A, the modules of the first subset 810 are disposed alternately with the modules of the second subset 820 and the modules of the second subset 820 are thinner than the modules of the first subset 810. As in the preceding example, the flat lines of the modules are substantially aligned.

As illustrated in FIG. 8B, the optical component then presents, in reflection and under the effect of a tilt movement, a dynamic visual effect comprising the crossing of two straight segments, 801, 802, associated respectively with the first subset of modules 810 and with the second subset of modules 820. Because of the alternation between modules having a convex region and modules having a concave region, in this example, the straight segments seem to cross by moving in opposite directions. The region occupied by the modules of the subset of modules 820 being smaller (because the modules are thinner), the straight segment 802 appears less light than the straight segment 801.

Figure 9A:
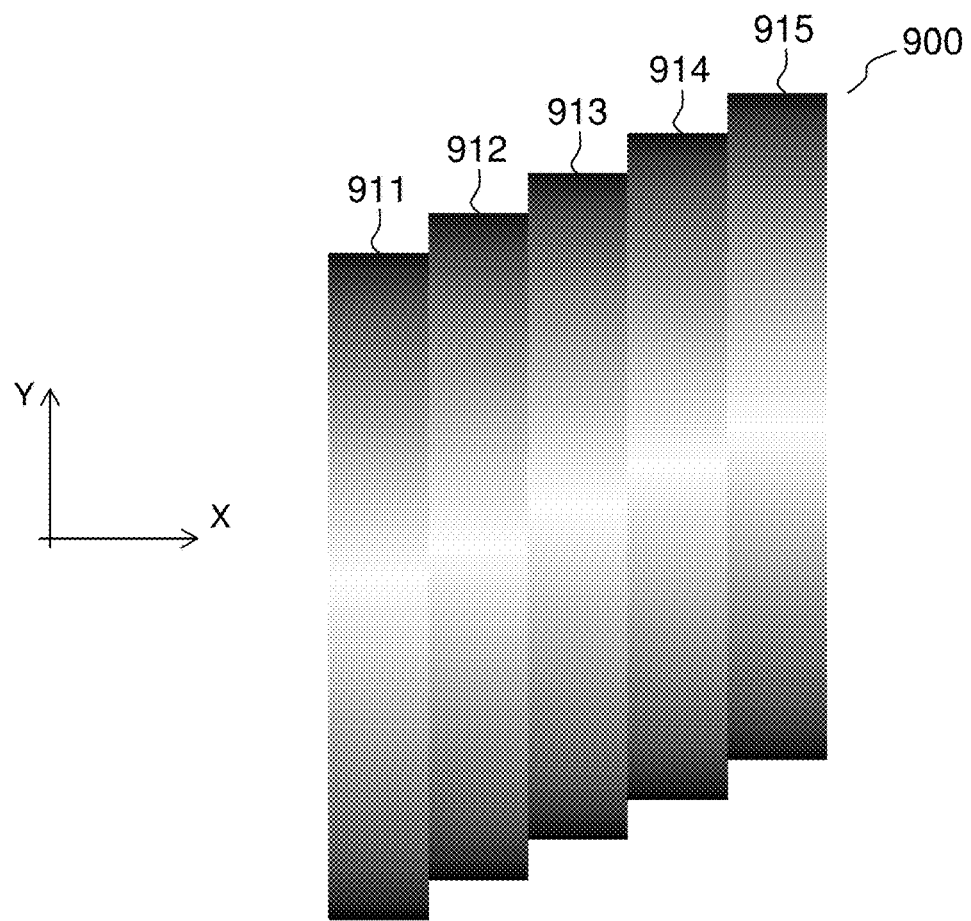
Figure 9B:
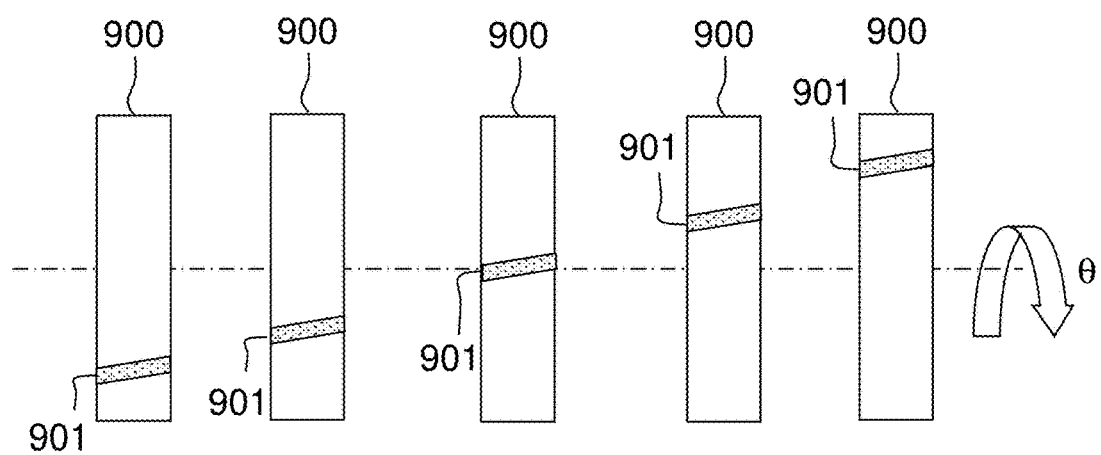

FIGS. 9A and 9B illustrate a third example of an optical security component 900 according to the present description.

In this example, the set of modules comprises a first subset of modules 911-915 making it possible to simulate optical elements with at least one convex region, such that, for two successive modules of the first subset of modules, said flat lines are staggered in the direction (Y) of variation of the slope. In practice, as is illustrated in FIG. 9B, it is possible to calculate identical modules which are disposed with a stagger. In the example of FIGS. 9A, 9B, the structure formed by the modules is "pupilated" (pupilation not represented in FIG. 9A) to make a substantially rectangular optical security component appear.

As illustrated in FIG. 9B, the optical component then presents, in reflection and under the effect of a tilt movement, a dynamic visual effect comprising the movement of an oblique straight segment 901, that is to say not parallel to the direction X of arrangement of the modules.

If the stagger between the flat lines of two successive modules is sufficiently small (typically less than 300 µm), an observer will be able to see a continuous line.

In the example of FIG. 9B, straight segments have been represented; however, with a staggering of the flat lines that is continuously variable, there could be any form of curved line by comprising at least one oblique individual straight segment formed by means of two successive modules.

Figure 10A:
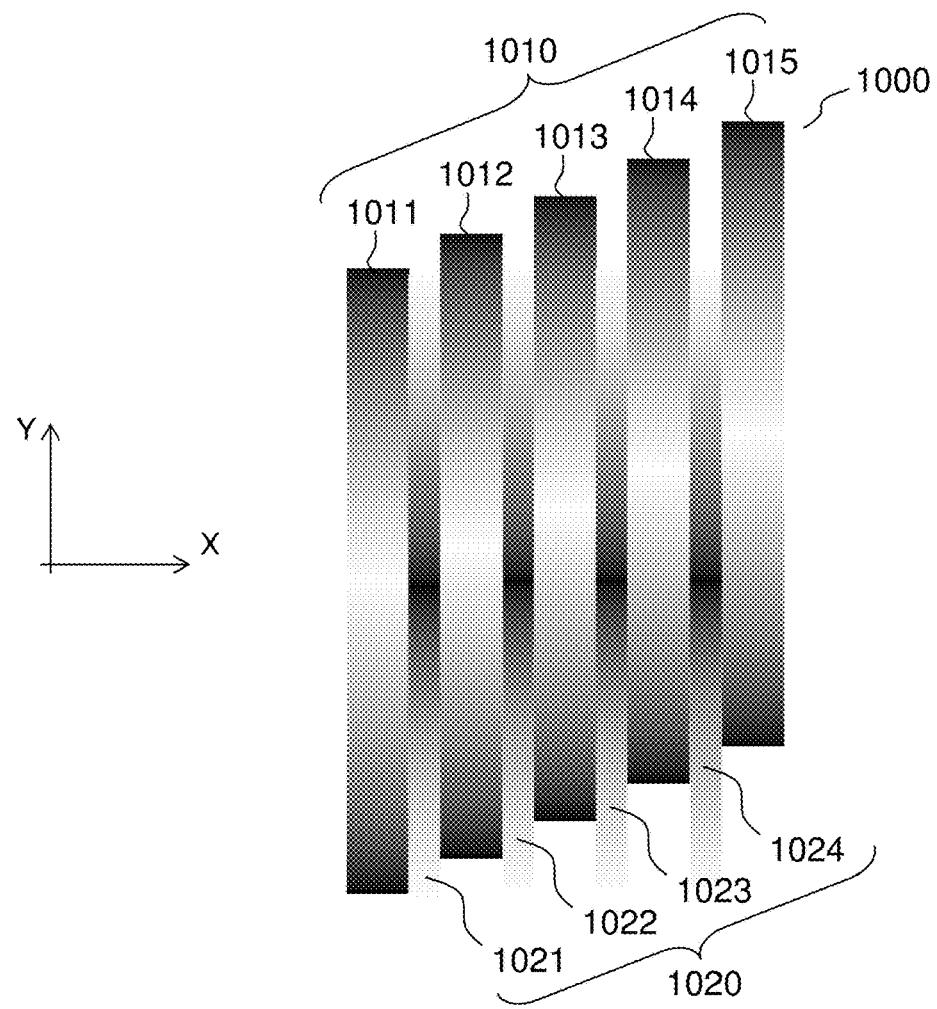
Figure 10B:
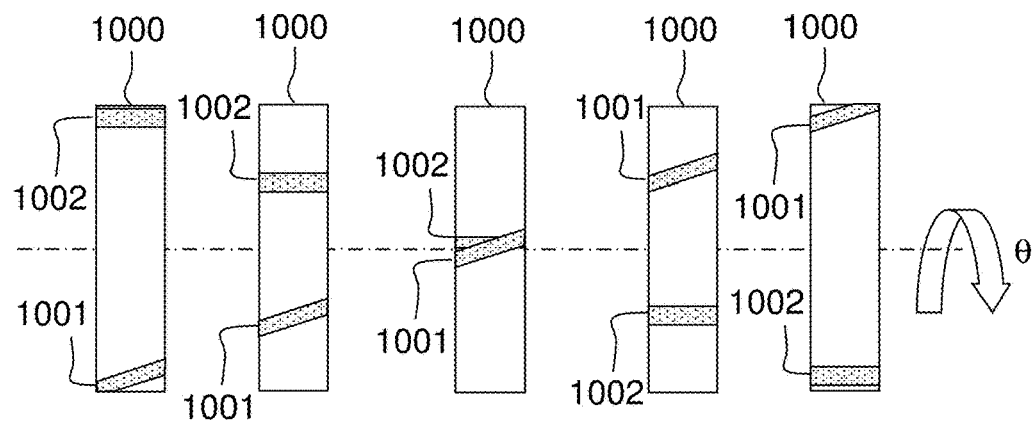

FIGS. 10A and 10B illustrate a fourth example of an optical security component 1000 according to the present description.

In this example, the set of modules comprises a first subset 1010 of modules 1011-1015 making it possible to simulate optical elements with at least one convex region, such that, for two successive modules of the first subset of modules, the flat lines are staggered in the direction (Y) of variation of the slope. The set of the modules comprises, moreover, a second subset 1020 of modules 1021-1024 making it possible to simulate optical elements with at least one concave region, the flat lines of the modules being substantially aligned.

As illustrated in FIG. 10B, the optical component then presents, in reflection and under the effect of a tilt movement, a dynamic visual effect comprising the movement in one direction of an oblique straight segment 1001, that is to say not parallel to the direction X of arrangement of the modules and, simultaneously, the movement in an opposite direction of a horizontal straight segment 1002.

Figure 11A:
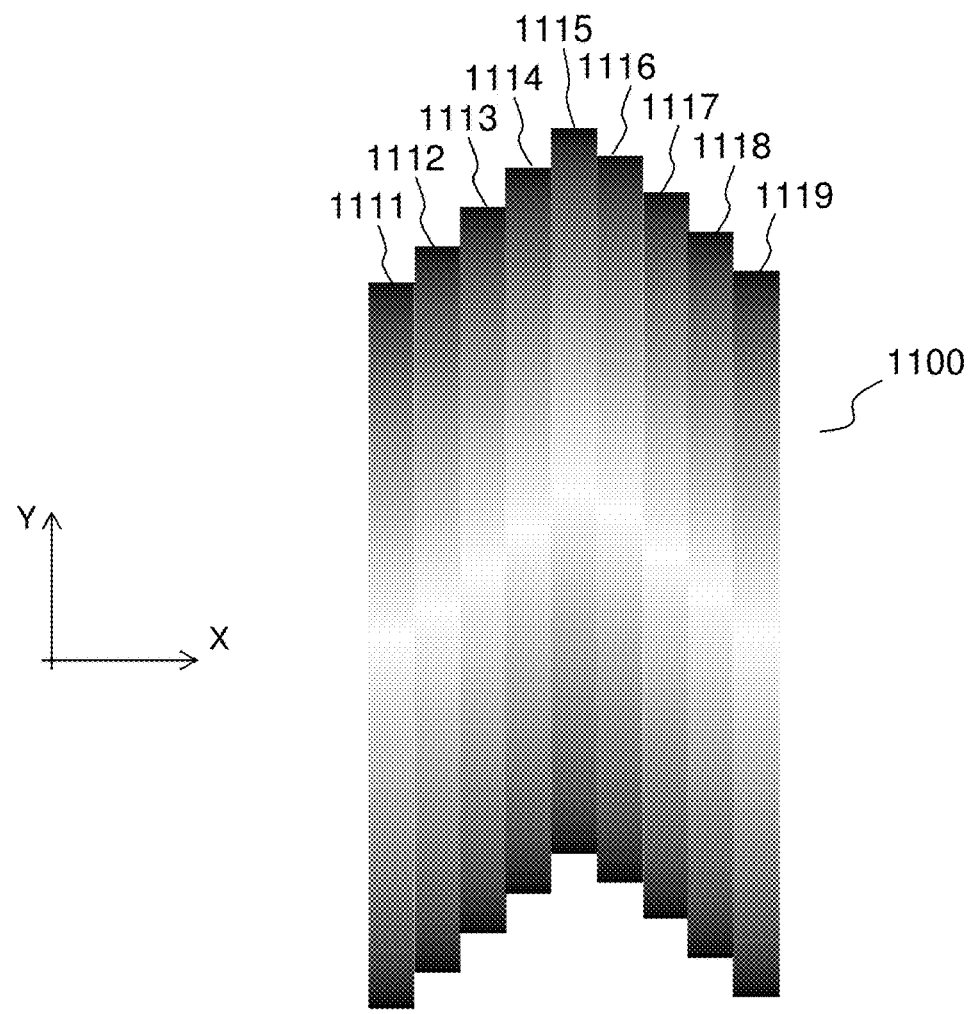
Figure 11B:
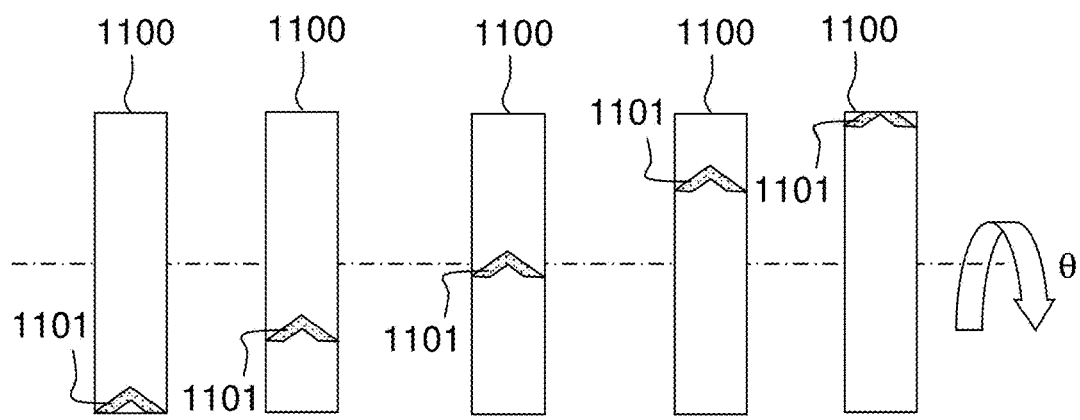

FIGS. 11A and 11B illustrate a fifth example of an optical security component 1100 according to the present description, substantially similar to that represented in FIG. 9A, but in which the modules 1111-1119 are arranged staggered relative to one another to form a chevron. The modules being identical but staggered, the optical security component presents, in reflection and under the effect of a tilt movement, a dynamic visual effect comprising the movement of a graphic object 1101, here a chevron, which moves on either side of a nominal position corresponding to a zero tilt, without being deformed.

Figure 12A:
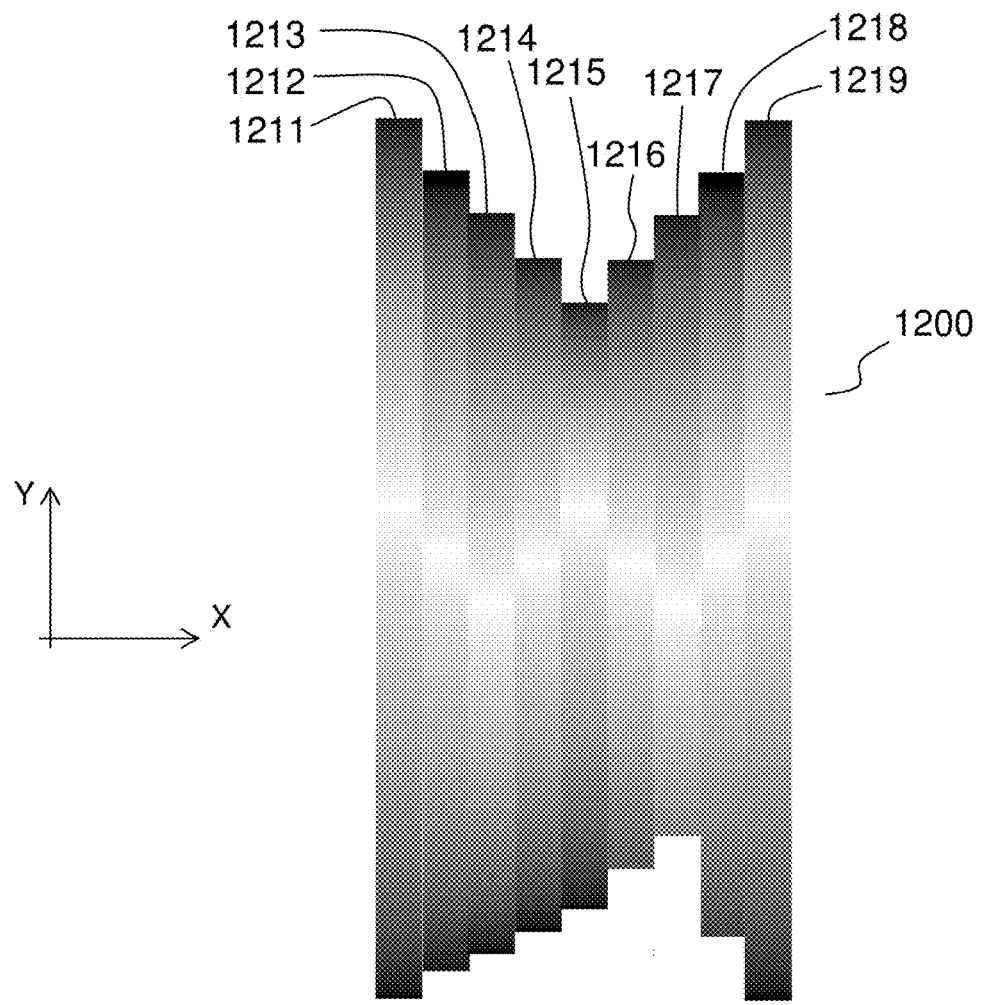
Figure 12B:
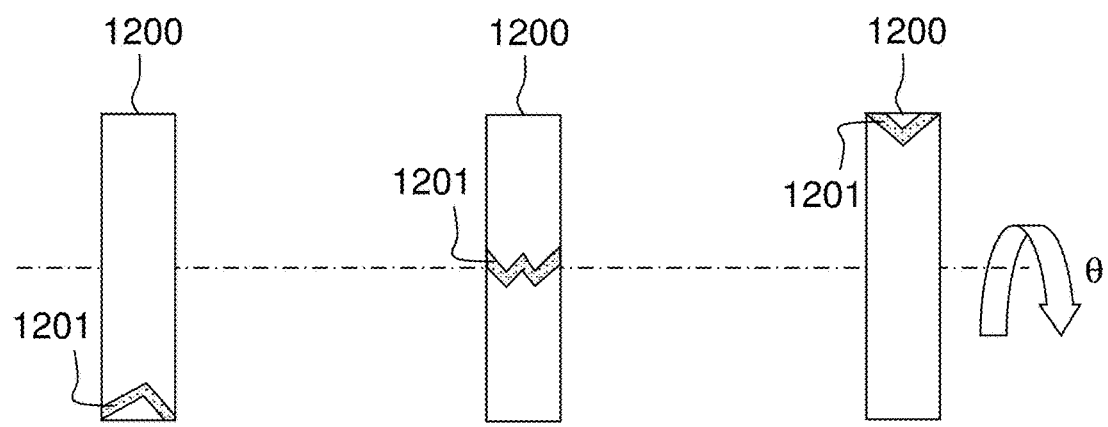

FIGS. 12A and 12B illustrate a sixth example of an optical security component 1200 according to the present description.

In this example, as in the example of FIGS. 9A, 9B, the set of modules comprises a first subset of modules 1211-1219 making it possible to simulate optical elements with at least one convex region, such that, for two successive modules of the first subset of modules, said flat lines are staggered in the direction (Y) of variation of the slope. In this example however, at least two of said modules of the first subset of modules have profiles of variation of the slope along the axis (Y) of variation of the slope that are different.

As illustrated in FIG. 12B, the optical component then presents, in reflection and under the effect of a tilt movement, a dynamic visual effect comprising the movement of a graphic element 1201 which is deformed while moving. As illustrated, the graphic element here takes three different independent forms at three tilt angles $-\theta_{max}$, $0°$, $+\theta_{max}$.

It is thus possible to combine a dynamic effect of a graphic element which moves on either side of a nominal position with a deformation of this graphic element, making the authentication of the component even more robust.

It is thus possible, by virtue of the optical component according to the present description, to form dynamic visual effects of complex graphic elements.

Figure 13A:
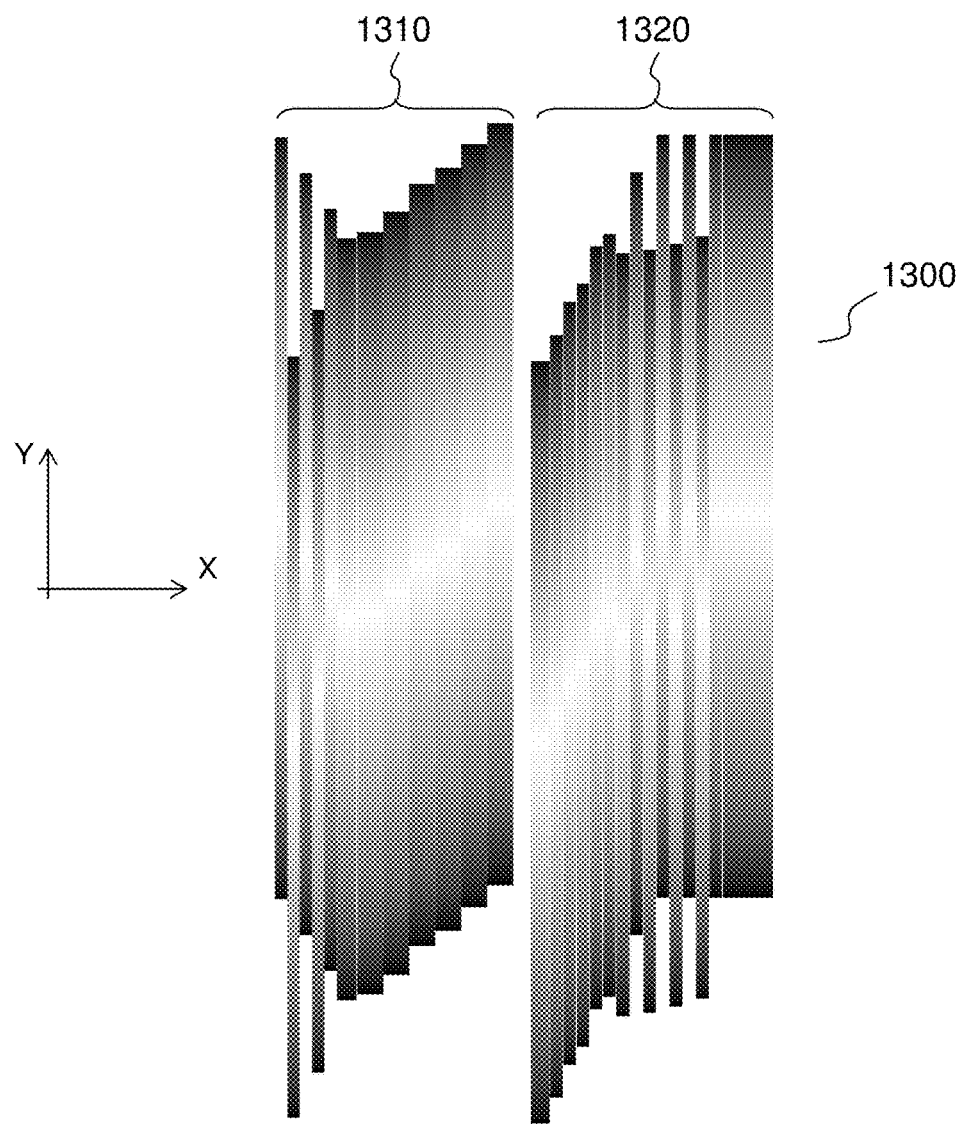
Figure 13B:
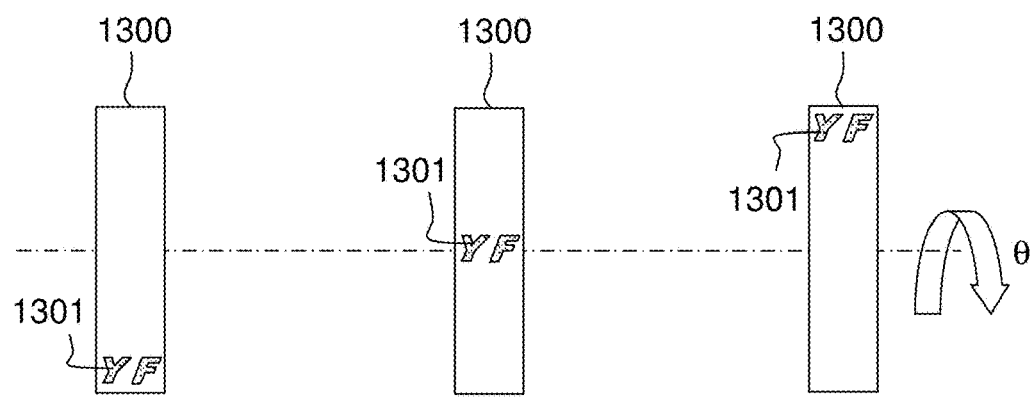
Figure 14A:
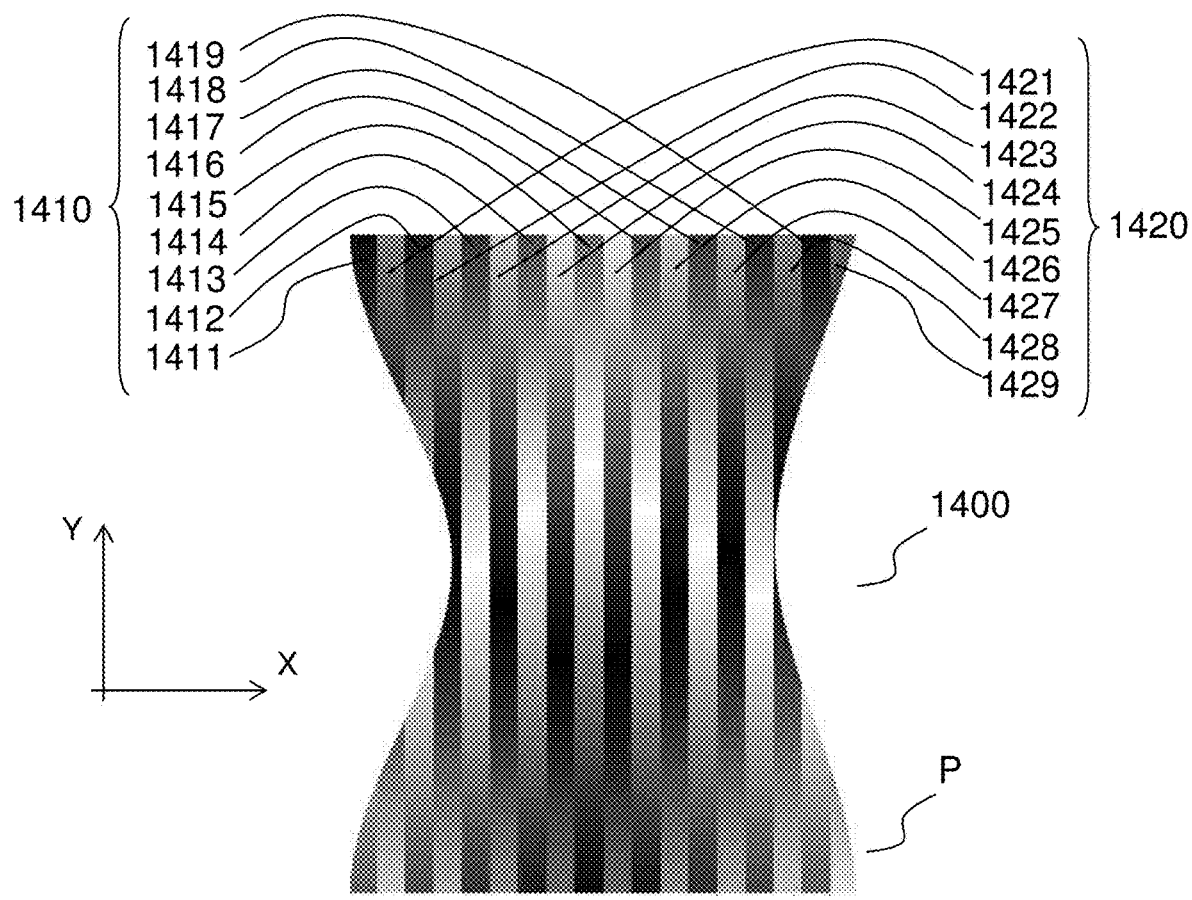
FIG. 14, a diagram illustrating an exemplary embodiment of an optical security component according to the present description, with a particular outline of the structure and the associated visual effects.

FIGS. 13A and 13B illustrate a seventh example of an optical security component 1300 according to the present description.

In this example, the set of modules comprises a first subset 1310 of modules making it possible to simulate optical elements with at least one convex region, such that, for two successive modules of the first subset of modules, the flat lines are staggered in the direction (Y) of variation of the slope so as to form a recognizable graphic sign "Y". The set of modules comprises, moreover, a second subset 1320 of modules also making it possible to simulate optical elements with at least one convex region, the flat lines of the modules being staggered in the direction (Y) of variation of the slope so as to form a recognizable graphic sign "F". In this example, the modules are identical but staggered.

As illustrated in FIG. 13B, the optical component then presents, in reflection and under the effect of a tilt movement, a dynamic visual effect comprising the movement of a complex graphic element 1301 (YF), which moves here without being deformed because the modules are all identical.

It should be noted that the horizontal bars of the F are obtained in this example by virtue of inset subsets of modules. It would have also been possible to obtain this effect with modules as described for example in FIGS. 5A to 5D, which make it possible to simulate optical elements with several regions of concavity/convexity.

Figure 14B:
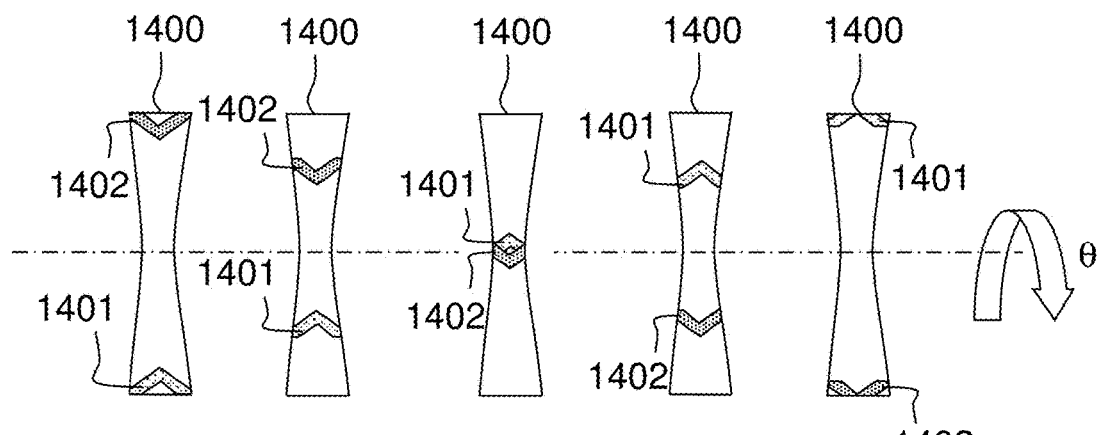

FIGS. 14A and 14B illustrate an eighth example of an optical security component 1400 according to the present description.

In this example, the set of modules comprises a first subset 1410 of modules 1411-1419 making it possible to simulate optical elements with at least one convex region, such that, for two successive modules of the first subset of modules, the flat lines are staggered in the direction (Y) of variation of the slope to form a first graphic element, in this example a chevron with an upward point. The set of the modules also comprises a second subset 1420 of modules 1421-1429 making it possible to simulate optical elements with at least one concave region, the flat lines of the modules being staggered in the direction (Y) of variation of the slope to form a second graphic element, in this example a chevron with a point downward. In this example, the structure is "pupilated" with a pupil P which itself recalls the form of the chevrons.

As illustrated in FIG. 14B, the optical component then presents, in reflection and under the effect of a tilt movement, a dynamic visual effect comprising the movement in one direction of a first graphic element 1401, and the movement in an opposite direction of the second graphic element 1402.

Nonlimiting examples of colored dynamic visual effects are now illustrated by means of FIGS. 15 to 18.

To obtain colored visual effects, the optical security components can comprise, as is illustrated in FIG. 2B, the first pattern $M_1$ modulated by a second pattern $M_2$ forming a periodic grating of period lying between 100 nm and 700 nm, advantageously between 200 nm and 500 nm, and which behaves in the visible spectrum as a so-called "sub-wavelength" grating, that is to say of a period less than the smallest wavelength used to observe the component. The grating is determined to produce, after deposition of the second layer 214 reflecting in the visible spectrum, a resonant filter in a first spectral band.

According to a first exemplary embodiment, the second layer 214 can comprise a layer made of dielectric material of refractive index $n_2$, encapsulated between the first layer 213 of dielectric material of refractive index $n_1$ and a third layer of dielectric material 215 of refractive index $n_3$; the resonant filter is a wavelength-subtractive filter, hereinafter in the description called "dielectric subtractive resonant filter". An example of such a filter is for example the DID™ (for "Diffractive Identification Device"), manufactured by the applicant. The second pattern forms a sub-wavelength grating, with one or two dimensions, adapted to allow the excitation of guided modes within the second layer 214, forming a bandpass resonant filter in reflection, whose resonance spectral band $\Delta\lambda$ is centered on a first wavelength $\lambda_1$. The second layer 214 comprises a thin layer, of thickness preferentially lying between 20 nm and 200 nm and preferentially between 60 nm and 150 nm, having a second refractive index n2 such that the second refractive index $n_2$ differs from the first refractive index $n_1$ and from the third refractive index $n_3$ by at least 0.3, advantageously by at least 0.5. According to one or more exemplary embodiments, said thin layer of dielectric material is a layer of so-called "high refractive index" ("HRI") material, having a refractive index lying between 1.8 and 2.9, advantageously between 2.0 and 2.4, and the first and third layers of dielectric material, on either side of the second layer, are so-called "low refractive index" layers, having refractive indexes lying between 1.3 and 1.8, advantageously between 1.4 and 1.7.

According to a second exemplary embodiment, the second layer 212 comprises a thin layer of metal material, for example of silver or of aluminum, advantageously of a thickness greater than 40 nm. The second pattern $M_2$ forms a sub-wavelength grating, with one or two dimensions, adapted to allow the formation of a band stop resonant filter in reflection. This is a reflection plasmon filter, called "R'Plasmon" in the present description, and as described for example in the patent application FR 2982038A1. Advantageously, the second metal layer 22 is sufficiently thick to exhibit a maximum residual transmission as a function of the wavelength of 2%.

The examples described by means of FIGS. 15 to 18 can comprise a structure of dielectric subtractive resonant filter type or of R'Plasmon type for example. In the case of a structure of dielectric subtractive resonant filter type, the optical security component will present an additional visual effect, namely a change of color upon an azimuthal rotation of the component, in the case where the grating forming the second pattern has one dimension. Advantageously, the optical component will comprise at least 2 zones in which the sub-wavelength gratings are respectively oriented according to the axes X and Y. The authenticity check of the dielectric subtractive resonant filter then consists in verifying the swapping between the 2 colors.

Figure 15A:
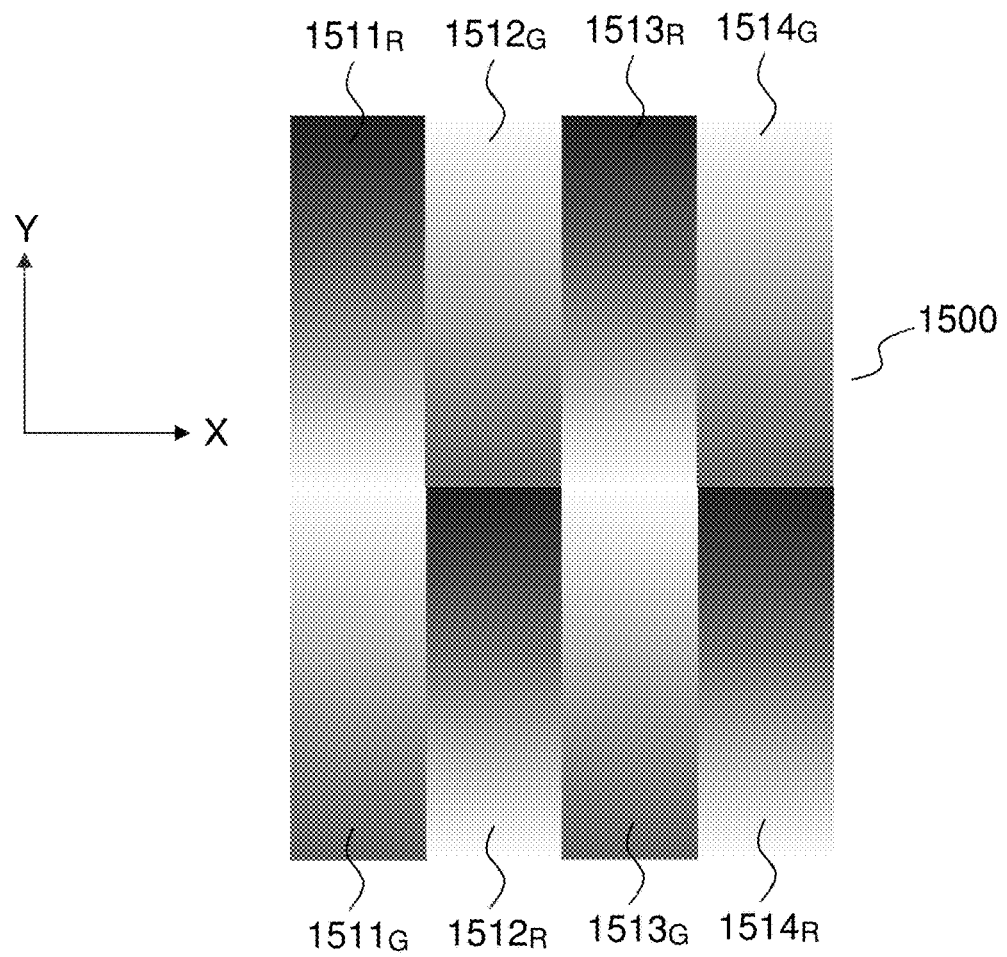
FIGS. 15 to 18, diagrams illustrating other embodiments of optical security components according to the present description, with modulation of the first pattern with a second pattern, in order to form colored dynamic visual effects.
Figure 15B:
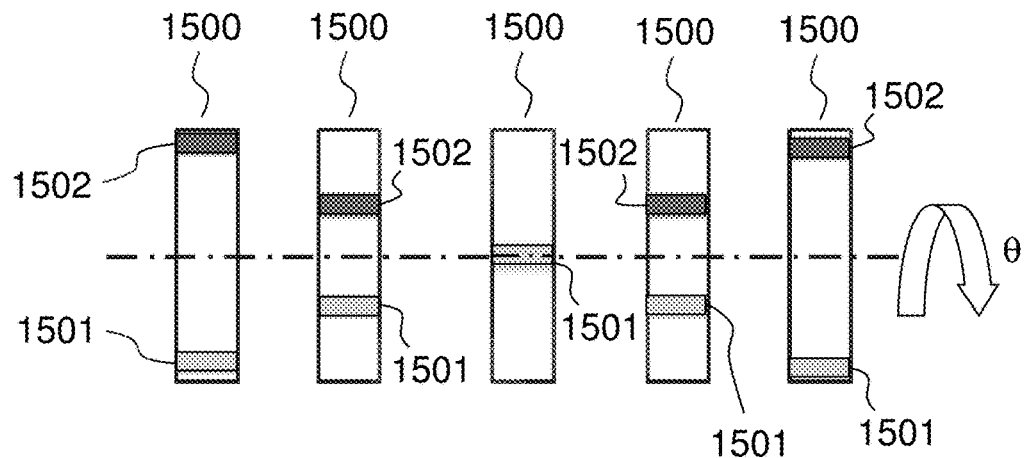

FIGS. 15A and 15B illustrate a first example of an optical security component 1500 according to the present description, with a colored dynamic visual effect.

In this example, the set of modules comprises a first subset of modules 1511, 1513 making it possible to simulate optical elements with at least one convex region, the flat lines being substantially aligned, and a second subset of modules 1512, 1514 making it possible to simulate optical elements with at least one concave region, the flat lines being substantially aligned on those of the modules of the first subset. As can be seen in FIG. 15A, the modules of the first subset are arranged alternately with the modules of the second subset. In this example, the first pattern of each module of the first subset of modules is modulated by a second pattern adapted to form, in a first region, a first color (region indicated by the index G), for example green, and, in a second region, a second color (region indicated by the index R), for example red. Moreover, the first pattern of each module of the second subset of modules is modulated by a second pattern adapted to form, in a first region, a first color (region G), for example green, and, in a second region, a second color (region R), for example red. In this example, as appears in FIG. 15A, the two regions making it possible to form, on each module, the two colors, are separated by the flat lines and the first and second colors are reversed between two consecutive modules respectively of the first and second subsets. Different colors can be obtained for example by dielectric subtractive resonant or R'Plasmon filter effects as described above. In particular, this effect can be obtained by using one and the same subwavelength modulation grating whose directions are oriented at right angles.

As illustrated in FIG. 15B, the optical component then presents, in reflection and under the effect of a tilt movement, a colored dynamic visual effect comprising the movement of a first colored line 1501 of the first color (green) in a first direction then in a second direction, as well as the movement of a second colored line 1502 of the second color (red) in directions opposite to those of the first colored line 1501. It should be noted that the color on the flat line is a composite color, in this example yellow, which results from an additive synthesis between the first and second colors.

Figure 16A:
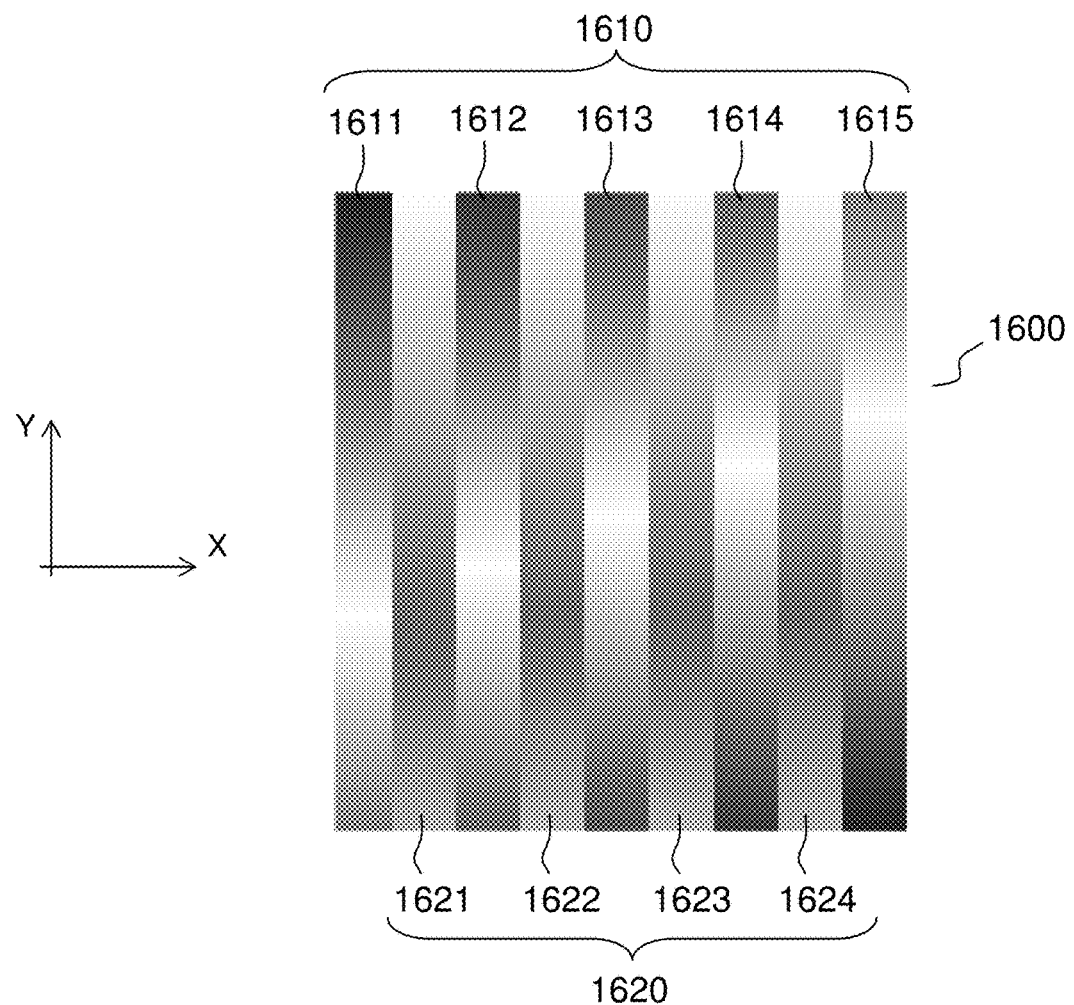
Figure 16B:
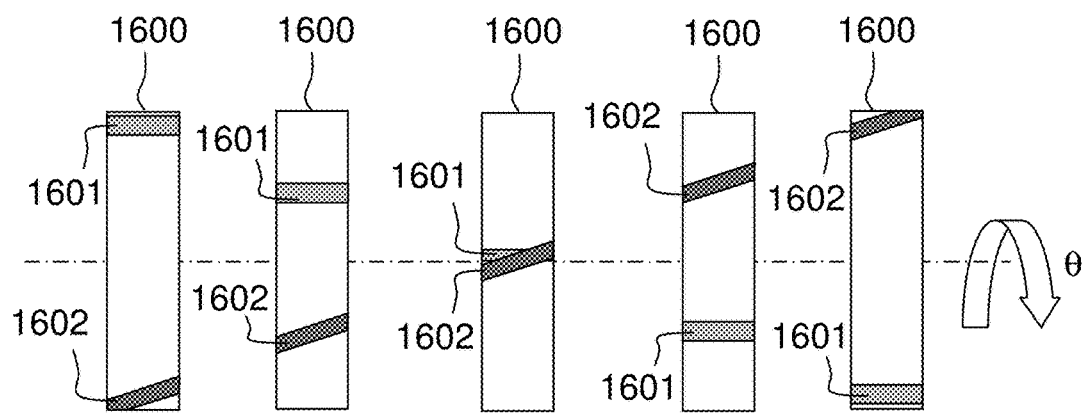

FIGS. 16A and 16B illustrate a second example of an optical security component 1600 according to the present description, with a colored dynamic visual effect.

As previously, the set of modules comprises a first subset 1610 of modules 1611-1615 making it possible to simulate optical elements with at least one convex region, the flat lines being staggered in this example, and a second subset 1620 of modules 1621-1624 making it possible to simulate optical elements with at least one concave region, the flat lines being substantially aligned. As previously, the first pattern of each module of the first subset of modules 1610 is modulated by a second pattern adapted to form a first color, for example red, and the first pattern of each module of the second subset of modules 1620 is modulated by a second pattern adapted to form a second color, for example green. Different colors can be obtained for example by the effects of a dielectric subtractive resonant or R'Plasmon filter as described above. As can be seen in FIG. 16A, the modules of the first subset are arranged alternated with the modules of the second subset; in this example, all the modules have a substantially identical width.

As illustrated in FIG. 16B, the optical component then presents, in reflection and under the effect of a tilt movement, a colored dynamic visual effect comprising the movement in one direction of a colored line 1601 (here a green line), and the movement in reverse direction of an oblique colored line 1602 (here a red line). For a zero tilt angle, the 2 bars are superposed and the colors merge as previously.

In the preceding examples, modules are alternated with different colors.

It is also possible to create a structure as described in the examples 7 to 14 and to modulate, with a second pattern, the first pattern of said structure, according to one or more predetermined outlines.

Figure 17A:
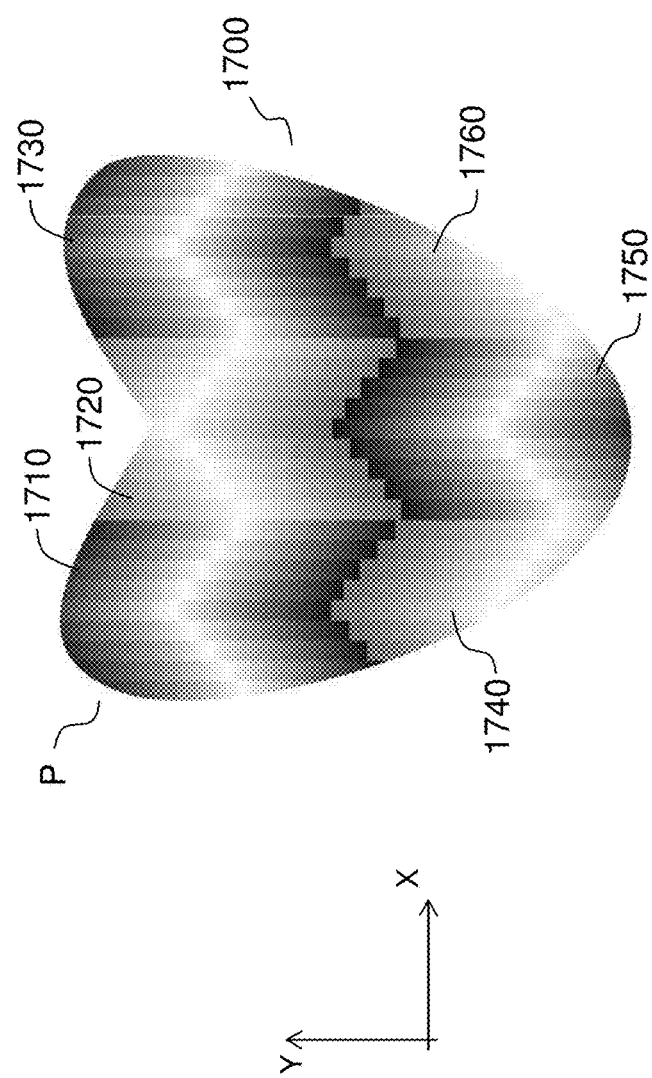

Thus, in FIG. 17A, the set of modules comprises different subsets of modules 1710, 1720, 1730, 1740, 1750, 1760 as described for example in FIG. 11A. Each of these subsets has a specific "color", for example red for the subsets 1710, 1730, 1750 and green for the subsets 1720, 1740, 1760, the colors being obtained by virtue of a modulation of the first pattern by a second pattern, the second pattern being specific to each subset.

The complete structure is moreover "pupilated" with a pupil P, for example in the form of a heart in this example.

Figure 17B:
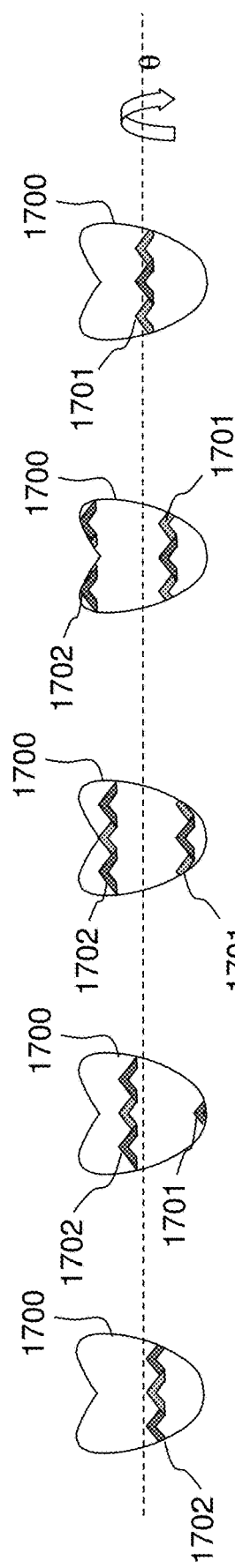

As illustrated in FIG. 17B, the optical component 1700 then presents, in reflection and under the effect of a tilt movement, a colored dynamic visual effect comprising the movement in the same direction of two graphic elements 1701 and 1702 each formed by chevrons of different and alternate colors.

Figure 18A:
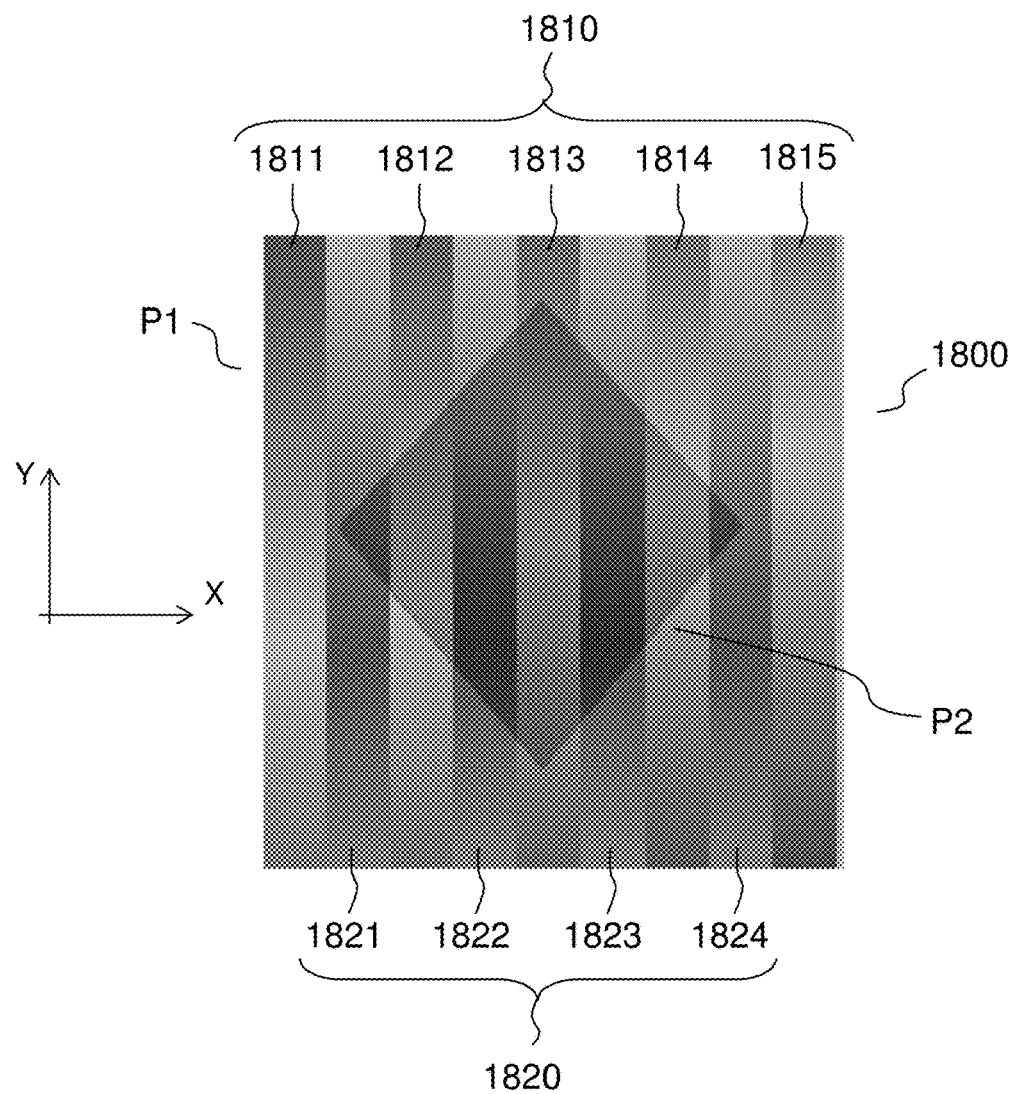

In the example of FIG. 18A, a structure of the type of that shown in FIG. 10A comprises a modulation of the first pattern by a second pattern, the second pattern being different in a first region P1 and in a second region P2. The region P2 (here represented by a rhomboid) is, this time, independent of the form of the arrangement of the modules 1811-1815 and of the modules 1821-1824 of subsets of modules 1810 and 1820.

Figure 18B:
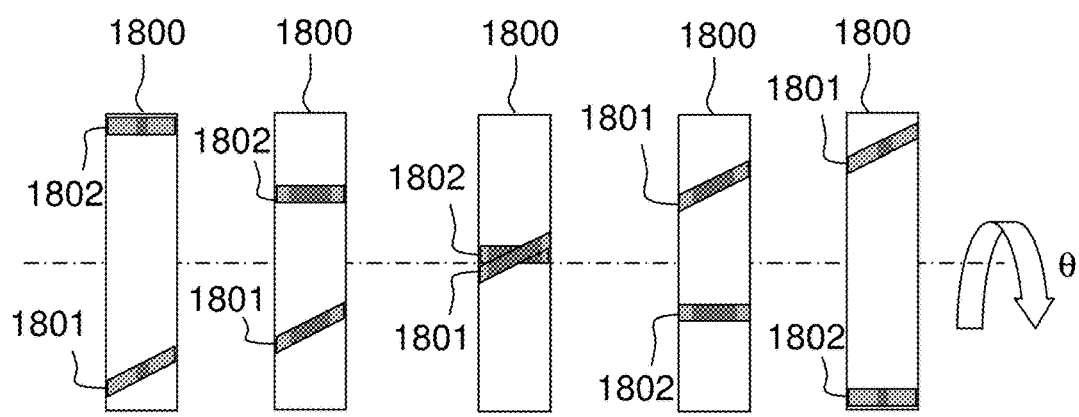

As illustrated in FIG. 18B, the optical component 1800 then presents, in reflection and under the effect of a tilt movement, a colored dynamic visual effect comprising the movement in reverse directions of two graphic elements 1801 and 1802 formed respectively by an oblique line and by a horizontal line, the color of the lines evolving between a nominal position with zero tilt and on either side of the nominal position.

The method for manufacturing optical security components according to the present description advantageously comprises the following steps:

The optical structure ($S_1$ or $S_2$) formed by the first pattern, possibly modulated by the second pattern, is registered by photolithography or electron beam lithography on a photosensitive support (or "photoresist"). A galvanoplasty step makes it possible to transfer the optical structure into a strong material, for example nickel-based, to produce a metal matrix or "master" comprising the optical structure. The fabrication of the optical security component then comprises a step of replication. For example, the replication can be performed by stamping (by hot pressing of the dielectric material, or "hot embossing") the first layer 213 (FIGS. 2A, 2B) made of dielectric material of refractive index $n_1$, for example a low-index layer, typically a stamping lacquer a few microns thick. The layer 213 is advantageously borne by the support film 211, for example a 12 μm to 100 μm film of polymer material, for example of PET (polyethylene terephthalate). The replication can also be done by molding the layer of stamping lacquer before drying, then UV crosslinking ("UV casting"). The replication by UV crosslinking makes it possible in particular to reproduce structures having a great depth amplitude and makes it possible to obtain a better replication fidelity. Generally, any other high resolution replication method known from the prior art can be used in the replication step. Then comes the deposition on the duly embossed layer of all of the other layers, for example the reflecting layer 214, the encapsulation layer 215 (optional), the opaque colored contrast layer 216 (optional) which can be deposited uniformly or printed to form a new pattern and the layer of glue or lacquer type (217, 218) by a coating method or a UV-crosslinkable lacquer, for example.

Although described through a certain number of exemplary embodiments, the optical security component according to the invention and the method for fabricating said component comprise different variants, modifications and refinements which will become apparent evidently to the person skilled in the art, it being understood that these different variants, modifications and refinements form part of the scope of the invention as defined by the following claims.

The invention claimed is:

1. An optical security component intended to be observed in reflection, with the naked eye, according to at least one first observation face, comprising:
   a first layer made of dielectric material, having a first refractive index;
   at least one first diffractive structure etched on said first layer;
   and in which:
   said at least one first diffractive structure is formed of a first pattern, wherein said first pattern is formed of a set of modules disposed side-by-side, in a direction of arrangement, a maximum width of each module defined in the direction of arrangement being less than 300 μm, wherein said set of modules comprises a minimum number of modules so that a minimum dimension of said at least one first diffractive structure in the direction of arrangement is greater than 1 mm;
   each module comprises a bas-relief with a first set of facets whose forms are determined to simulate an optical element visible in reflection, with at least one convex region and/or at least one concave region, having a profile with a variable slope in a single direction, called direction of variation of the slope, at right angles to the direction of arrangement;

for two modules disposed side-by-side, the slope, in said direction of variation of the slope, is different between said two modules along at least one line parallel to the direction of arrangement;

the optical security component having, in reflection and under the effect of a tilt movement about an axis parallel to said direction of arrangement, a dynamic visual effect comprising a movement of one or more graphic elements.

2. The optical security component as claimed in claim 1, in which the set of modules comprises a first subset of modules and a second subset of modules, such that:

the modules of the first subset of modules make it possible to simulate optical elements with at least one concave region;

the modules of the second subset of modules make it possible to simulate optical elements with at least one convex region;

the modules of the first subset are disposed alternately with the modules of the second subset;

the optical security component having, in reflection and under the effect of a tilt movement, a dynamic visual effect comprising a crossing of two straight segments.

3. The optical security component as claimed in claim 1, in which the set of modules comprises at least one first subset of modules, such that:

the modules of said at least one first subset of modules make it possible to simulate optical elements with, for each of said optical elements, at least one first concave region or at least one first convex region, each of said at least one first concave region or at least one first convex region comprising a flat line parallel to the direction of arrangement;

for two successive modules of said at least one first subset of modules, said flat lines are staggered in the direction of variation of the slope;

the optical security component having, in reflection and under the effect of a tilt movement, a dynamic visual effect comprising a movement of an oblique straight segment.

4. The optical security component as claimed in claim 1, in which the set of modules comprises at least one first subset of modules, such that:

the modules of said at least one first subset of modules make it possible to simulate optical elements with at least one first region that is concave for all said modules of said at least one first subset or convex for all said modules of said at least one first subset;

at least two of said modules of the first subset of modules have profiles with different slope variation functions;

the optical security component having, in reflection and under the effect of a tilt movement, a dynamic visual effect of a moving graphic element being deformed.

5. The optical security component as claimed in claim 1, in which at least one of said modules makes it possible to simulate an optical element having a profile with a variable slope in said direction of variation of the slope, the slope being symmetrical in absolute value relative to a flat line parallel to the direction of arrangement.

6. The optical security component as claimed in claim 1, in which at least one of said modules makes it possible to simulate an optical element having a profile with a variable slope in said direction of variation of the slope, the slope being dissymmetrical in absolute value relative to a flat line for which the slope is canceled.

7. The optical security component as claimed in claim 1, in which at least one of said modules makes it possible to simulate an optical element with at least one concave region and at least one convex region.

8. The optical security component as claimed in claim 1, in which said modules of the set of modules each have a width that is substantially constant in said direction of variation of the slope, at least two of said modules having a different width.

9. The optical security component as claimed in claim 1, in which at least one of said modules has a width that is variable in said direction of variation of the slope.

10. The optical security component as claimed in claim 1, also comprising a second layer, at least partly covering said at least one first diffractive structure, and having a spectral band of reflection in the visible spectrum.

11. The optical security component as claimed in claim 10, in which, in at least one first region, said first pattern is modulated by a second pattern forming a periodic grating with one or two dimensions of period lying between 100 nm and 700 nm, determined to produce, after deposition of the second layer, a resonant filter in a first spectral band.

12. The optical security component as claimed in claim 11, also comprising:

a third layer made of dielectric material deposited on said second layer and having a third refractive index;

and in which:

the second layer is a thin layer of dielectric material, having a second refractive index such that the difference between the second refractive index and the first refractive index and the difference between the second refractive index and the third refractive index are greater than or equal to 0.3;

the second pattern is adapted to produce, after deposition of the second layer and encapsulation of said at least one first diffractive structure by the third layer, a bandpass resonant filter in reflection.

13. The optical security component as claimed in claim 11, in which:

the second layer is a thin layer made of metal material, of thickness greater than 40 nm;

the second pattern is adapted to produce a band stop resonant filter in reflection.

14. The optical security component as claimed in claim 1, in which said at least one first diffractive structure has an outline forming a recognizable graphic form.

15. A method for fabricating an optical security component intended to be observed in reflection, with the naked eye, according to an observation face, the method comprising:

the deposition on a support film of a first layer of a material having a first refractive index;

the formation on said first layer of at least one first diffractive structure, such that:

said at least one first diffractive structure is formed of a first pattern, wherein said first pattern is formed of a set of modules disposed side-by-side, in a direction of arrangement, a maximum width of each module defined in the direction of arrangement being less than 300 µm, wherein said set of modules comprises a minimum number of modules so that a minimum dimension of said at least one first diffractive structure in the direction of arrangement is greater than 1 mm;

each module comprises a bas-relief with a first set of facets whose forms are determined to simulate a visible optical element in reflection, with at least one convex region and/or at least one concave region, having a profile with a variable slope in a single direction, called direction of variation of the slope, at right angles to the direction of arrangement;

for two modules disposed side-by-side the slope, in said direction of variation of the slope, is different between said two modules along at least one line parallel to the direction of arrangement.

16. The method for fabricating an optical security component as claimed in claim 15, also comprising the deposition of a second layer, at least partly covering said at least one first diffractive structure, and having a spectral band of reflection in the visible spectrum.

17. A method for authenticating an optical security component as claimed in claim 11, comprising:

a step of illumination of said optical security component in natural light and the observation, through a polarizer, of a local extinction of the colored effect; or a step of illumination of said optical security component in linear polarized light and the observation of a local extinction of the colored effect.

* * * * *